(12) United States Patent
Wang

(10) Patent No.: US 11,623,147 B2
(45) Date of Patent: Apr. 11, 2023

(54) METHOD, DEVICE, AND STORAGE MEDIUM FOR DISPLAYING AZIMUTH IN VIRTUAL SCENE

(71) Applicant: TENCENT TECHNOLOGY (SHENZHEN) COMPANY LIMITED, Shenzhen (CN)

(72) Inventor: Han Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/893,687

(22) Filed: Jun. 5, 2020

(65) Prior Publication Data

US 2020/0298116 A1 Sep. 24, 2020

Related U.S. Application Data

(63) Continuation of application No. PCT/CN2019/079915, filed on Mar. 27, 2019.

(30) Foreign Application Priority Data

Apr. 17, 2018 (CN) .......................... 201810343837.4

(51) Int. Cl.
   *A63F 13/537* (2014.01)
   *G01C 21/04* (2006.01)
   *G06T 11/20* (2006.01)

(52) U.S. Cl.
   CPC ............ *A63F 13/537* (2014.09); *G01C 21/04* (2013.01); *G06T 11/206* (2013.01)

(58) Field of Classification Search
   None
   See application file for complete search history.

(56) References Cited

U.S. PATENT DOCUMENTS 6,597,382 B1 * 7/2003 Charles ............... G06F 3/04815
                                                     715/823
7,557,736 B1 * 7/2009 Daily ..................... G01C 21/20
                                                     340/995.1

(Continued)

FOREIGN PATENT DOCUMENTS

CN          102317900 A     1/2012
CN          104740875 A     7/2015

(Continued)

OTHER PUBLICATIONS

Assassin's Creed Origins guide: Beginner's Guide by Jeffrey Parkin Dec. 27, 2017, 2:58pm EST https://www.polygon.com/assassins-creed-origins-guide/2017/12/27/16540856/beginners-guide.*

(Continued)

*Primary Examiner* — Jason A Pringle-Parker
(74) *Attorney, Agent, or Firm* — Crowell & Moring LLP

(57) ABSTRACT

The present disclosure describes methods, devices, and storage medium for displaying an azimuth in a virtual scene, which belongs to the field of computer technologies. The method includes obtaining, by a device, an orientation azimuth of a virtual object in a virtual scene. The device includes a memory storing instructions and a processor in communication with the memory. The method further includes obtaining, by the device, a plurality of azimuths, angles between the plurality of azimuths and the orientation azimuth being no larger than a preset angle, the plurality of azimuths comprising first azimuths and second azimuths. The method also includes symmetrically distributing, by the device, the first azimuths and the second azimuths centered and on two sides of the orientation azimuth to obtain a target horizontal bar dial; and displaying, by the device, the target horizontal bar dial in a visual field image of the virtual object.

15 Claims, 14 Drawing Sheets

(56) References Cited

U.S. PATENT DOCUMENTS

| | | | |
|---|---|---|---|
| 8,015,507 B2* | 9/2011 | Madsen | G10H 1/0025 |
| | | | 715/824 |
| 8,243,097 B2* | 8/2012 | Pantfoerder | G01C 17/30 |
| | | | 345/619 |
| 10,807,001 B2* | 10/2020 | Ge | A63F 13/537 |
| 2002/0038388 A1* | 3/2002 | Netter | G06F 9/451 |
| | | | 719/318 |
| 2006/0025218 A1* | 2/2006 | Hotta | A63F 13/2145 |
| | | | 463/37 |
| 2006/0293847 A1* | 12/2006 | Marriott | G01C 21/32 |
| | | | 701/455 |
| 2007/0010325 A1 | 1/2007 | Suzuki et al. | |
| 2010/0110025 A1* | 5/2010 | Lim | G08C 21/00 |
| | | | 345/173 |
| 2010/0137027 A1* | 6/2010 | Kim | G06F 3/03547 |
| | | | 345/173 |
| 2010/0188503 A1* | 7/2010 | Tsai | H04N 21/42202 |
| | | | 348/142 |
| 2011/0175821 A1* | 7/2011 | King | G06F 3/04883 |
| | | | 345/173 |
| 2011/0187744 A1 | 8/2011 | Kim et al. | |
| 2011/0302527 A1* | 12/2011 | Chen | G06F 16/957 |
| | | | 715/781 |
| 2011/0320151 A1* | 12/2011 | Ito | H04M 1/72427 |
| | | | 702/92 |
| 2013/0086517 A1* | 4/2013 | Van Lancker | G06F 3/04845 |
| | | | 715/788 |
| 2014/0114845 A1* | 4/2014 | Rogers | G06Q 20/145 |
| | | | 705/39 |
| 2014/0240313 A1* | 8/2014 | Varga | G06F 3/013 |
| | | | 345/419 |
| 2018/0366090 A1* | 12/2018 | Shatzki | B64D 43/00 |
| 2019/0099673 A1* | 4/2019 | Shao | A63F 13/5375 |
| 2019/0235241 A1* | 8/2019 | Suzuki | G06F 3/013 |

FOREIGN PATENT DOCUMENTS

| | | |
|---|---|---|
| CN | 107754305 A | 3/2018 |
| CN | 107899235 A | 4/2018 |
| CN | 108499104 A | 9/2018 |

OTHER PUBLICATIONS

Assassins Creed ORIGINS Walkthrough PART 1 https://www.youtube.com/watch?v=kxRCjN6Kx8o Oct. 24, 2017.*

Fortnite Wiki Guide May 4, 2018 https://www.ign.com/wikis/fortnite/Fortnite_Mobile#Fortnite_Mobile_Controls).*

Compass Navigator Pro https://forum.unity.com/threads/compass-navigator-pro-skyrim-like-compass-bar-mini-map-fog-of-war-system.397139/ Apr. 12, 2016.*

International Search Report with English translation and Written Opinion regarding PCT/CN2019/079915 dated Jun. 26, 2019, 10 pages.

Chinese Office Action with concise English translation regarding CN201810343837.4 dated Aug. 15, 2021, 11 pages.

Chinese Office Action and Concise English Explanation of Relevance regarding CN201810343837.4 dated Dec. 31, 2021, 11 pages.

* cited by examiner

METHOD, DEVICE, AND STORAGE MEDIUM FOR DISPLAYING AZIMUTH IN VIRTUAL SCENE

RELATED APPLICATION

This application is a continuation application of PCT Patent Application No. PCT/CN2019/079915, filed on Mar. 27, 2019, which claims priority to Chinese Patent Application No. 201810343837.4, filed on Apr. 17, 2018, both of which are incorporated herein by reference in their entireties.

FIELD OF THE TECHNOLOGY

This application relates to the field of computer technologies, and in particular, to a method for displaying an azimuth in a virtual scene, an electronic device, and a medium.

BACKGROUND OF THE DISCLOSURE

With the development of computer technologies and the diversity of terminal functions, more types of video games can be played on a terminal. In a video game, a virtual object and a virtual scene are usually displayed, and a user may control the virtual object through an operation to move in the virtual scene. In most cases, the user needs to learn a position of the virtual object in the virtual scene and a position of a destination to determine a moving direction.

At present, in the video game, a terminal usually displays a coordinate position of the virtual object on a screen. When there is a destination, the terminal may further display a coordinate position of the destination on the screen. The user may determine, according to the two coordinate positions, how to control the virtual object to reach the destination. In the foregoing video game, there is less display information about an azimuth in the virtual scene, the user has to determine an azimuth of the destination relative to the virtual object according to the coordinate positions provided by the terminal, and then control the virtual object to move based on a determining result, the display efficiency is low, and the reference value of the display information is low. As a result, there is an urgent need for a method for displaying an azimuth in a virtual scene to improve the display efficiency and the reference value of the virtual scene.

SUMMARY

Embodiments of this application provide a method for displaying an azimuth in a virtual scene, an electronic device, and a medium, to improve the display efficiency and the reference value of the virtual scene.

The present disclosure describes a method for displaying an azimuth in a virtual scene. The method includes obtaining, by a device, an orientation azimuth of a virtual object in a virtual scene. The device includes a memory storing instructions and a processor in communication with the memory. The method further includes obtaining, by the device, a plurality of azimuths, angles between the plurality of azimuths and the orientation azimuth being no larger than a preset angle, the plurality of azimuths comprising first azimuths and second azimuths. The method also includes symmetrically distributing, by the device, the first azimuths and the second azimuths centered and on two sides of the orientation azimuth to obtain a target horizontal bar dial; and displaying, by the device, the target horizontal bar dial in a visual field image of the virtual object.

The present disclosure describes a device for displaying an azimuth in a virtual scene. The device includes a memory storing instructions; and a processor in communication with the memory. When the processor executes the instructions, the processor is configured to cause the device to obtain an orientation azimuth of a virtual object in a virtual scene, and obtain a plurality of azimuths, angles between the plurality of azimuths and the orientation azimuth being no larger than a preset angle, the plurality of azimuths comprising first azimuths and second azimuths. When the processor executes the instructions, the processor is configured to further cause the device to symmetrically distribute the first azimuths and the second azimuths centered and on two sides of the orientation azimuth to obtain a target horizontal bar dial, and display the target horizontal bar dial in a visual field image of the virtual object.

The present disclosure describes a non-transitory computer-readable storage medium storing computer readable instructions. The computer readable instructions, when executed by a processor, are configured to cause the processor to perform obtaining an orientation azimuth of a virtual object in a virtual scene; and obtaining a plurality of azimuths, angles between the plurality of azimuths and the orientation azimuth being no larger than a preset angle, the plurality of azimuths comprising first azimuths and second azimuths. The computer readable instructions, when executed by a processor, are configured to further cause the processor to symmetrically distributing the first azimuths and the second azimuths centered and on two sides of the orientation azimuth to obtain a target horizontal bar dial; and displaying the target horizontal bar dial in a visual field image of the virtual object.

According to an aspect, a method for displaying an azimuth in a virtual scene is provided, the method being applied to an electronic device, and including:

obtaining an orientation azimuth of a virtual object in the virtual scene;

obtaining a plurality of azimuths, angles between the azimuths and the orientation azimuth being less than or equal to a target angle, the plurality of azimuths including first azimuths and second azimuths, there being angles between the first azimuths and the orientation azimuth in a target rotation direction, there being angles between the second azimuths and the orientation azimuth in an opposite direction of the target rotation direction, and the target rotation direction being clockwise or counterclockwise;

symmetrically distributing the first azimuths and the second azimuths of the plurality of azimuths centered on the orientation azimuth on both sides of the orientation azimuth, to obtain a target horizontal bar dial, a plurality of azimuths on each side of the orientation azimuth being distributed in ascending order of angles; and displaying the target horizontal bar dial in a visual field picture of the virtual object.

According to an aspect, an apparatus for displaying an azimuth in a virtual scene is provided, the apparatus including:

an obtaining module, configured to obtain an orientation azimuth of a virtual object in the virtual scene;

the obtaining module being further configured to obtain a plurality of azimuths, angles between the azimuths and the orientation azimuth being less than or equal to a target angle, the plurality of azimuths including first azimuths and second azimuths, there being angles between the first azimuths and the orientation azimuth in a target rotation direction, there being angles between the second azimuths and the orientation azimuth in an opposite direction of the target rotation direction, and the target rotation direction being clockwise or counterclockwise; and the obtaining module being further configured to symmetrically distribute the first azimuths and the second azimuths of the plurality of azimuths centered on the orientation azimuth on both sides of the orientation azimuth, to obtain a target horizontal bar dial, a plurality of azimuths on each side of the orientation azimuth being distributed in ascending order of angles; and a display module, configured to display the target horizontal bar dial in a visual field picture of the virtual object.

According to an aspect, an electronic device is provided. The electronic device includes: a processor; and a memory configured to store a computer program, the processor being configured to execute the computer program stored in the memory, to implement the method operations of the method for displaying an azimuth in a virtual scene.

According to an aspect, a computer-readable storage medium is provided. The computer-readable storage medium stores a computer program, and when being executed by a processor, the computer program implements the method operations of the method for displaying an azimuth in a virtual scene.

In the embodiments of this application, an orientation azimuth of a virtual object is obtained, then a plurality of azimuths centered on the orientation azimuth are obtained according to the orientation azimuth, a target horizontal bar dial is generated, and the target horizontal bar dial is displayed in a visual field picture of the virtual object, so that the azimuth situation of the virtual scene based on the virtual object is displayed, thereby improving the display efficiency of the virtual scene, and the azimuth reference is provided for the virtual object, thereby improving the reference value of display information of the virtual scene.

BRIEF DESCRIPTION OF THE DRAWINGS

To describe the technical solutions in the embodiments of the present disclosure more clearly, the accompanying drawings required for describing the embodiments are briefly described below. Apparently, the accompanying drawings in the following description show merely some embodiments of the present disclosure, and a person of ordinary skill in the art may obtain other accompanying drawings from the accompanying drawings without creative efforts.

DESCRIPTION OF EMBODIMENTS

Figure 1:
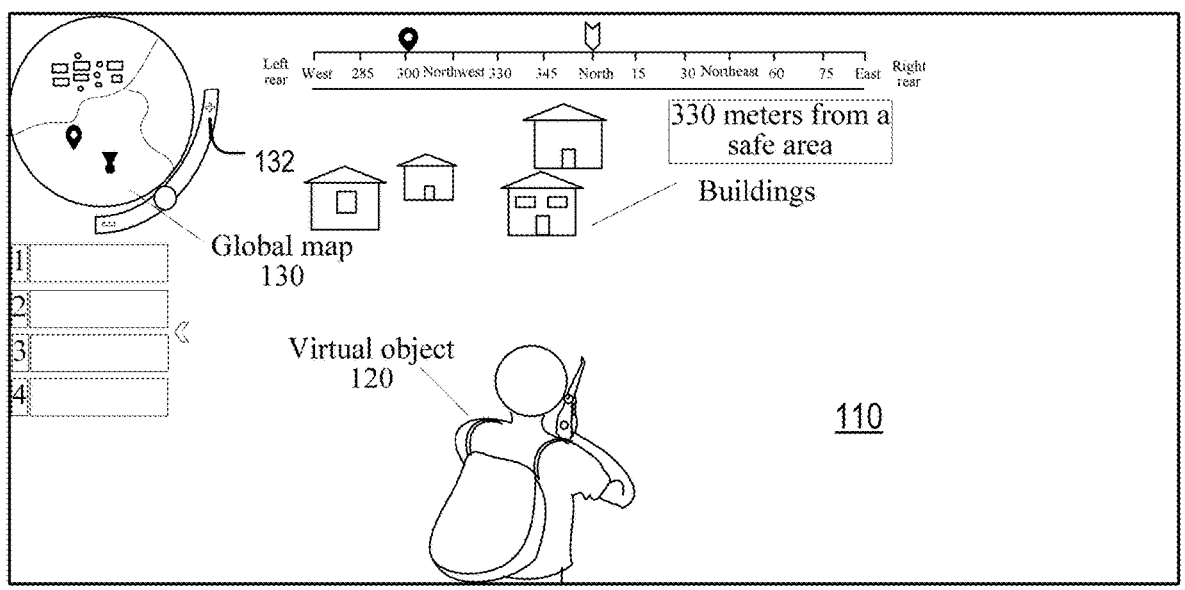
FIG. 1 is a schematic diagram of a terminal interface according to an embodiment of the present disclosure.

To make the objectives, technical solutions, and advantages of the present disclosure clearer, the following further describes implementations of the present disclosure in detail with reference to the accompanying drawings.

Embodiments of the present disclosure mainly relate to a video game scene or a simulated training scene. For example, in the video game scene, a user may perform an operation on a terminal in advance, and a game configuration file of a video game may be downloaded after the terminal detects the operation of the user. The game configuration file may include an application program, interface display data, virtual scene data, or the like of the video game, so that the user may invoke the game configuration file when logging in to the video game on the terminal, so as to render and display a video game interface. The user may perform a touch operation on the terminal, and after detecting the touch operation, the terminal may determine game data corresponding to the touch operation and render and display the game data. The game data may include virtual scene data, behavioral data of a virtual object in the virtual scene, and the like.

The virtual scene in the embodiments of the present disclosure may be used for simulating a three-dimensional virtual space, or may be used for simulating a two-dimensional virtual space, and the three-dimensional virtual space or the two-dimensional virtual space may be an open space. The virtual scene may be used for simulating an actual environment in reality. For example, the virtual scene may include sky, land, ocean, and the like, and the land may include environmental elements like a desert and a city. The user may control a virtual object to move in the virtual scene. The virtual object may be a virtual image representing the user in the virtual scene, or may be a virtual object representing a creature associated with the user in the virtual scene, for example, a pet of the user. The virtual image may be in any form, for example, a person or an animal. This is not limited in the embodiments of the present disclosure. There may be a plurality of virtual objects in the virtual scene. Each virtual object has a shape and a volume in the virtual scene, and occupies some space in the virtual scene.

Using a shooting game as an example, in the virtual scene, the user may control the virtual object to fall freely, glide, or fall after a parachute is opened in the sky; or to run, jump, creep, stoop and move forward in the land; or control the virtual object to swim, float, or dive in the ocean. Certainly, the user may further control the virtual object to ride in a vehicle to move in the virtual scene. The foregoing scenes are used as an example only herein. This is not specifically limited in the embodiments of the present disclosure. The user may further control the virtual object to fight against another virtual object with a weapon. The weapon may be a cold weapon, or may be a hot weapon. This is not specifically limited in the embodiments of the present disclosure.

When rendering and displaying the foregoing virtual scene, the terminal may display the virtual scene in full screen. The terminal may alternatively independently display a global map in a first target area on a current display interface while displaying the virtual scene on the current display interface. In a possible implementation, the terminal may display the global map only when detecting a click operation on a target button. The global map is used for displaying a thumbnail of the virtual scene, and the thumbnail is used for describing geographic characteristics of the virtual scene, for example, topography, landform, and geographic location. Certainly, the terminal may further display thumbnails of virtual scenes within a specific distance around the current virtual object on the current display interface. When detecting a click operation on the global map, the terminal displays a thumbnail of the overall virtual scene in a second target area of the current display interface, so that the user can view not only the virtual scenes around the user, but also the overall virtual scene. When detecting a zooming operation on a thumbnail (e.g., a thumbnail of global map or a thumbnail of virtual scenes within a specific distance around the virtual object), the terminal may alternatively zoom the thumbnail and display the zoomed thumbnail. The zooming operation may be a zooming-in operation or a zooming-out operation. Specific display positions and shapes of the first target area and the second target area may be set according to an operating habit of the user. The shapes of the first/second target area may be a rectangle, a square, a circle, an oval, or the like.

For example, the first target area may be a rectangular area in the upper right corner, the lower right corner, the upper left corner, or the lower left corner of the current display interface, and the second target area may be a square area on the right or left side of the current display interface, so as to not excessively block the virtual scene. Certainly, the first target area and the second target area may alternatively be circular areas or areas of other shapes. Specific display positions and shapes of the target areas are not limited in the embodiments of the present disclosure. For example, as shown in FIG. 1, the terminal displays the virtual scene 110 on the current display interface, the virtual object 120 and buildings are displayed in the virtual scene, and the global map 130 is displayed in the upper left corner of the current display interface. The zoom scale bar 132 next to the global map 130 may be used to zoom-in or zoom-out the global map.

In a possible implementation, the virtual object is a virtual avatar of the user. A first-person viewing angle is used as an example. The virtual scene viewed by the user is usually a virtual scene observed from a viewing angle of the virtual object, and in reality, when a person is moving, a viewing angle is usually in front of the person. The viewing angle of the virtual object is a viewing angle of the virtual scene, and a viewing angle direction of the virtual scene may be an orientation direction of the virtual object. For the viewing angle of the virtual scene, the terminal may display areas corresponding to different angles in the same virtual scene according to different viewing angles. The first-person viewing angle is merely used as an example for the foregoing description, and the virtual scene may alternatively be an area observed from another viewing angle. For example, the virtual scene may be observed from a third-person viewing angle, and a direction of the viewing angle may be parallel to a viewing angle direction of the virtual object. The third-person viewing angle may be used for reflecting an objective viewing angle for observing the virtual scene other than the viewing angle of the virtual object, and details are not described in the embodiments of the present disclosure.

In a possible implementation, the user may alternatively perform a viewing angle adjustment operation on the terminal to adjust the viewing angle. When detecting the viewing angle adjustment operation, the terminal may adjust the viewing angle according to the viewing angle adjustment operation. The viewing angle adjustment operation may be a slide operation or a click operation. For example, the viewing angle adjustment operation is a slide operation. The user may perform a slide operation on a terminal screen. When detecting the slide operation, the terminal may adjust the viewing angle according to a slide direction of the slide operation, so that a moving direction of the viewing angle is the same as the slide direction. Optionally, an angle by which the viewing angle moves may be positively correlated with a slide distance of the slide operation. A larger slide distance indicates a larger angle by which the viewing angle moves.

In a possible implementation, a virtual joystick area may be further set, and the virtual joystick area is different from a virtual joystick area used for controlling movement of a virtual object. The virtual joystick area is used for detecting a touch operation of the user, so as to implement the step of adjusting the viewing angle. When detecting the touch operation in the virtual joystick area, the terminal determines a viewing angle adjustment direction and a viewing angle adjustment angle based on the touch operation according to relative positions of an end point of the touch operation in the virtual joystick area and an origin of the virtual joystick area.

Optionally in one implementation, the viewing angle adjustment direction may be determined as a direction of the end point of the touch operation relative to the origin of the virtual joystick area. The viewing angle adjustment angle may be positively correlated with a distance between the end point of the touch operation and the origin of the virtual joystick area. A larger distance may indicate a larger viewing angle adjustment angle.

Figure 2:
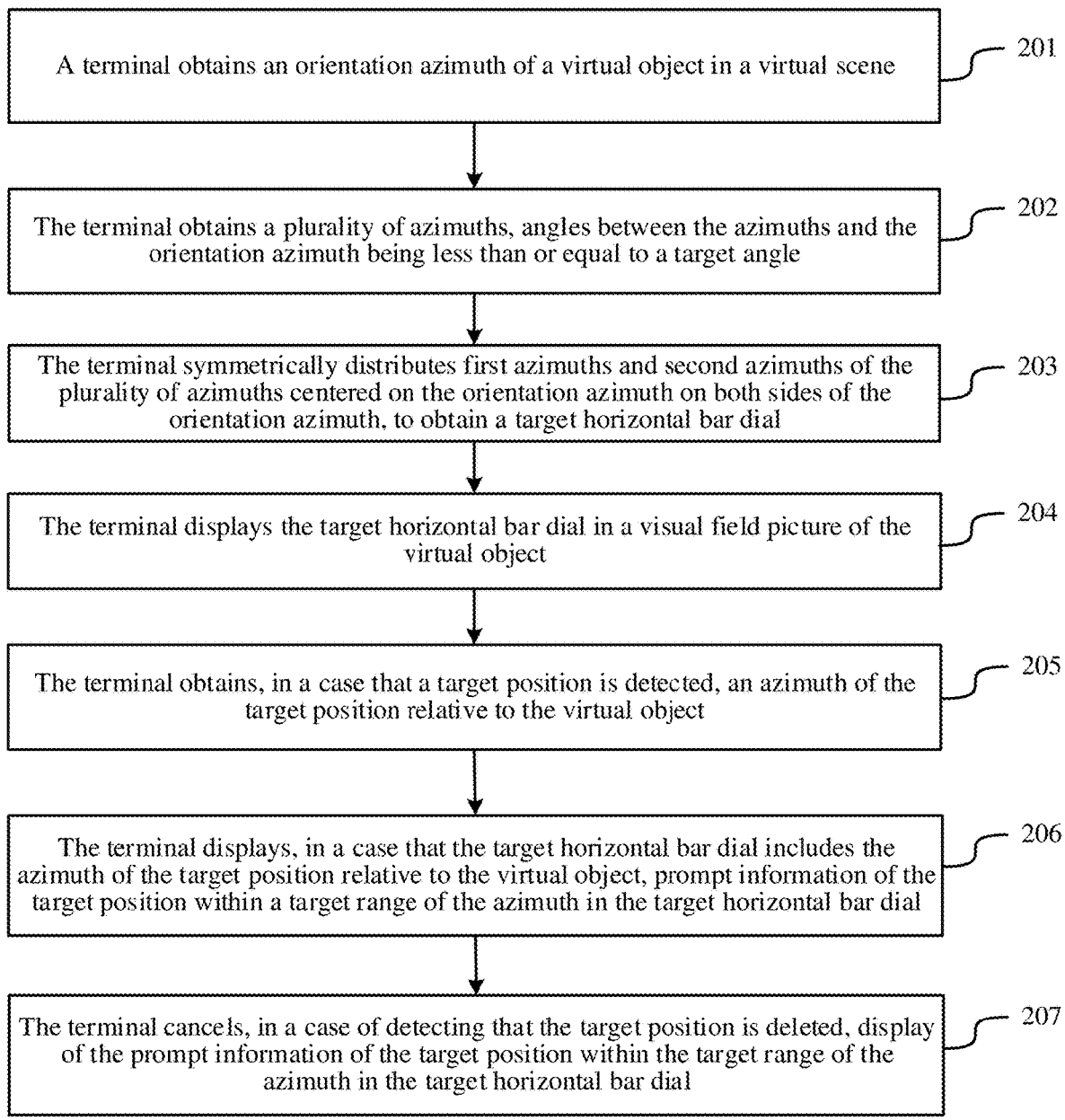
FIG. 2 is a flowchart of a method for displaying an azimuth in a virtual scene according to an embodiment of the present disclosure.

FIG. 2 is a flowchart of a method for displaying an azimuth in a virtual scene according to an embodiment of the present disclosure. The method is applied to an electronic device. The electronic device may be a terminal or a server. This is not limited in this embodiment of the present disclosure. In this embodiment of the present disclosure, description is made only by using an example in which the electronic device is a terminal. Referring to FIG. 2, the method for displaying an azimuth in a virtual scene includes the following steps:

201. A terminal obtains an orientation azimuth of a virtual object in the virtual scene.

A current viewing angle of the virtual scene is a viewing angle of the virtual object. When displaying an azimuth in the virtual scene currently displayed on the terminal, an orientation azimuth of the virtual object in the virtual scene may be first obtained, so as to display other azimuths within a visual field range of the virtual object based on the orientation azimuth of the virtual object.

An orientation of the virtual object refers to a facing direction of the virtual object, for example, a facing direction of a head or face of the virtual object. In this embodiment of the present disclosure, the orientation of the virtual object refers to a projection direction of the facing direction of the virtual object in the horizontal direction in a three-dimensional coordinate system. For example, if the virtual object is in a posture of standing, squatting, jumping, or floating in the virtual scene, the orientation of the virtual object refers to directly in front of the virtual object, for example, an orientation in front of a head or face of the virtual object. If the virtual object is in a posture of going prone, swimming or flying in the virtual scene, the orientation of the virtual object refers to a projection direction of a direction from the feet of the virtual object to the head of the virtual object in the horizontal direction in a three-dimensional coordinate system. Certainly, if the virtual scene is used for simulating a two-dimensional virtual space, the orientation of the virtual object may alternatively refer to the facing direction of the virtual object. In this embodiment of the present disclosure, description is made only by using an example in which the virtual scene is a three-dimensional virtual scene. This is not specifically limited in this embodiment of the present disclosure.

The orientation azimuth of the virtual object refers to a direction position of the facing direction of the virtual object in the horizontal direction. For example, the orientation azimuth of the virtual object may be an azimuth of the facing direction of the virtual object in a horizontal plane.

In a possible implementation, the orientation azimuth of the virtual object in the virtual scene may be represented by a yaw angle in attitude angles of the virtual object. The yaw angle may be a yaw coordinate in a target Cartesian coordinate system whose origin is the center of the virtual object. The yaw coordinate may range from 0° to 360°, and certainly, the yaw coordinate may alternatively range from −180° to 180°. The target Cartesian coordinate system is a three-dimensional coordinate system. Representation of the coordinate range of the yaw angle is not specifically limited in this embodiment of the present disclosure. The foregoing yaw angle is also an azimuth angle, and the azimuth angle may be a horizontal angle formed through rotation from a target direction of a specific origin to a target direction line according to a target rotation direction, namely, a rotation angle. In a possible implementation, the azimuth angle may be a horizontal angle formed through rotation from a north direction of a specific point to a target direction line according to a clockwise direction, so that a real scene may be simulated more really. Certainly, the foregoing target rotation direction may alternatively be a counterclockwise direction. This is not specifically limited in this embodiment of the present disclosure.

Correspondingly, the target direction and the target rotation direction may be preset in the virtual scene. When performing step 201, the terminal may use the orientation of the virtual object as the target direction, and obtain a horizontal angle using the virtual object as an origin and formed through rotation from the target direction in the virtual scene to the target direction line according to the target rotation direction. The horizontal angle is the orientation azimuth of the virtual object in the virtual scene.

Figure 3:
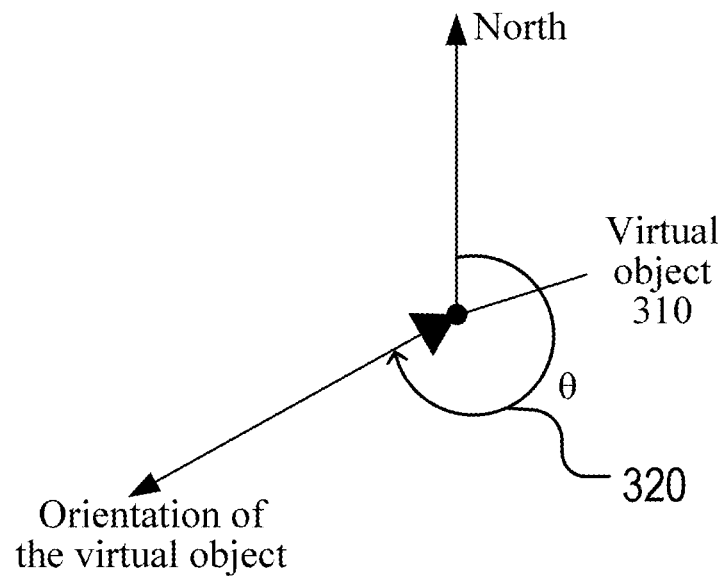
FIG. 3 is a schematic diagram of a method for obtaining an orientation azimuth according to an embodiment of the present disclosure.

For example, in a video game scene or a simulated scene, the top just in a global map of the virtual scene is used as the target direction, the target direction may be north, and the target rotation direction is clockwise. As shown in FIG. 3, an overlooking direction is used as the viewing angle, a dot 310 represents the virtual object, and θ may be used as the orientation azimuth 320 of the virtual object. For example, if θ is 240°, the orientation azimuth of the virtual object is 240°.

202. The terminal obtains a plurality of azimuths, angles between the azimuths and the orientation azimuth being less than or equal to a target angle, the plurality of azimuths including first azimuths and second azimuths. The target angle may include a preset angle.

There are angles between the first azimuths and the orientation azimuth in a target rotation direction, there are angles between the second azimuths and the orientation azimuth in an opposite direction of the target rotation direction, and the target rotation direction is clockwise or counterclockwise. The target angle may be preset by a related technician. For example, the target angle may be 90° or 60°, and a value range of the target angle may be from 0° to 180°. The related technician may select any value from the value range as the target angle according to a requirement. The value of the target angle is not specifically limited in this embodiment of the present disclosure.

After obtaining the orientation azimuth of the virtual object, the terminal may obtain a plurality of azimuths adjacent to the orientation azimuth based on the orientation azimuth, so as to provide the azimuth situation of the current virtual scene based on the virtual object. Certainly, the plurality of azimuths may alternatively be all azimuths, and a specific quantity of azimuths to be obtained may be determined by the foregoing target angle. This is not specifically limited in this embodiment of the present disclosure. In a possible implementation, when obtaining the azimuths adjacent to the orientation azimuth, the terminal may determine which azimuths are to be obtained based on a size relationship between an angle between each azimuth and the orientation azimuth and the target angle. Since the angle is not the foregoing azimuth angle and does not have a direction, when obtaining the plurality of azimuths, the terminal may obtain first azimuths and second azimuths through division in the target rotation direction of the orientation azimuth or in an opposite direction of the target rotation direction according to the angle between the azimuth and the orientation azimuth.

Figure 4:
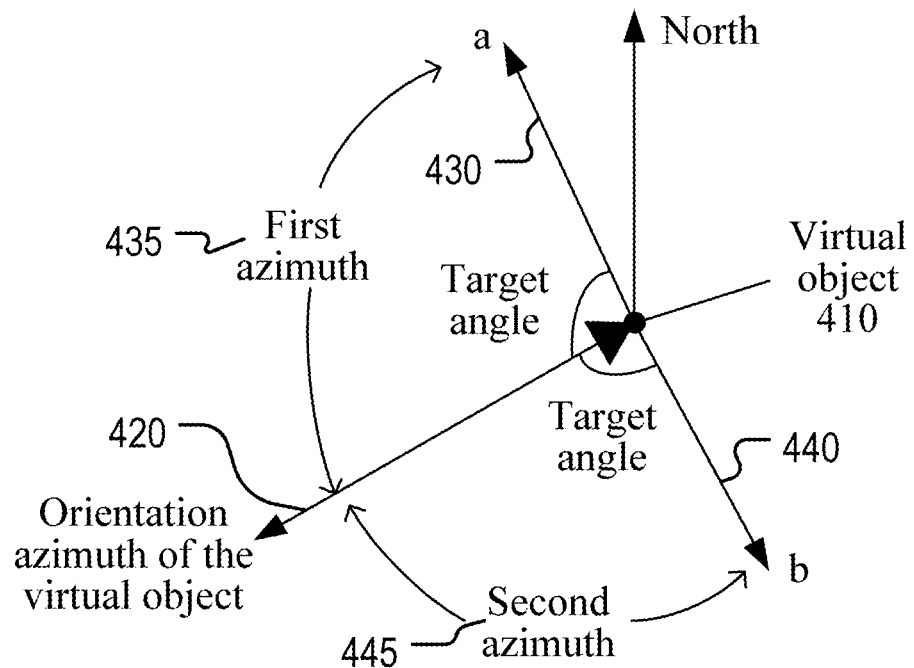
FIG. 4 is a schematic diagram of a method for obtaining a plurality of azimuths centered on an orientation azimuth according to an embodiment of the present disclosure.

For example, as shown in FIG. 4, the target angle is 90°, and the target rotation direction is the clockwise direction. An angle between an azimuth a 430 or an azimuth b 440 and the orientation azimuth 420 of the virtual object 410 is equal to the target angle, the terminal may obtain a plurality of azimuths passed by during rotation from the azimuth b to the azimuth a 430 according to the clockwise direction, and the plurality of azimuths also include the azimuth a 430 and the azimuth b 440. Azimuths between the orientation azimuth and the azimuth a 430 are the first azimuths 435, and there are angles between the first azimuths and the orientation azimuth in the clockwise direction. Azimuths between the orientation azimuth and the azimuth b 440 are the second azimuths 445, and there are angles between the second azimuths and the orientation azimuth in the counterclockwise direction. It may also be considered that a plurality of azimuths passed by during rotation from the orientation azimuth of the virtual object to the azimuth a according to the clockwise direction are the first azimuths, and a plurality of azimuths passed by during rotation from the azimuth b to the orientation azimuth of the virtual object according to the clockwise direction are the second azimuths. If the orientation azimuth of the virtual object is 240°, the azimuth a is 330°, the azimuth b is 150°, and the plurality of azimuths are 150° to 330°, where the first azimuths are 240° to 330°, and the second azimuths are 150° to 240°.

203. The terminal symmetrically distributes the first azimuths and the second azimuths of the plurality of azimuths centered on the orientation azimuth on both sides of the orientation azimuth, to obtain a target horizontal bar dial, a plurality of azimuths on each side of the orientation azimuth being distributed in ascending order of angles.

In this embodiment of the present disclosure, the plurality of azimuths obtained may be organized in a specific organization manner, so that a relationship between each azimuth and the virtual object is more intuitive. Therefore, the position situation of the virtual object in the virtual scene and the azimuth situation of the virtual scene are more intuitively and accurately represented. Specifically, the terminal may generate a target horizontal bar dial based on the obtained azimuths, to organize the plurality of obtained azimuths in the form of a horizontal bar dial.

Since the virtual scene viewed by the user through the terminal is observed from the viewing angle of the virtual object through simulation, the orientation azimuth of the virtual object may be set at the center of the target horizontal bar dial, and the first azimuths and the second azimuths of the plurality of obtained azimuths are symmetrically distributed on both sides of the orientation azimuth, so that the azimuth situation of the virtual scene when a real character is in the position of the virtual object may be simulated more really. That is, the first azimuths are distributed on one side of the orientation azimuth, and the second azimuths are distributed on the other side of the orientation azimuth. For either side of the orientation azimuth, the plurality of azimuths are distributed in ascending order of angles between the azimuths and the orientation azimuth.

Figure 5:
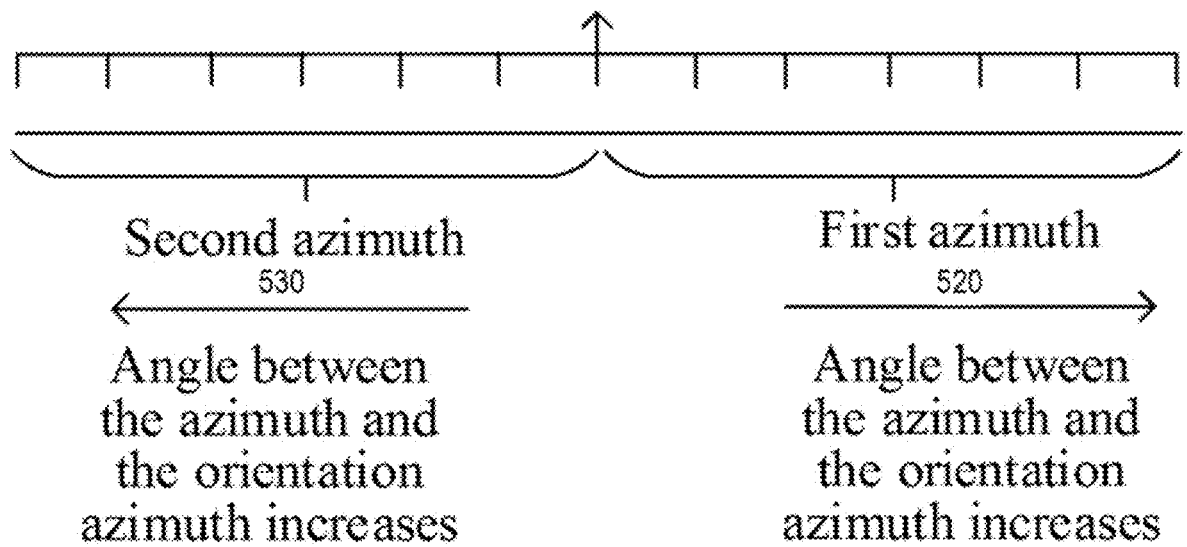
FIG. 5 is a schematic diagram of a target horizontal bar dial according to an embodiment of the present disclosure.

Specifically, the center of the target horizontal bar dial is the orientation azimuth, and the first azimuths and the second azimuths are located on both sides of the orientation azimuth. The foregoing process may be understood as that: the first azimuths and the second azimuths are projected on a horizontal line parallel to the azimuth a or the azimuth b shown in FIG. 4, the first azimuths and the second azimuths are distributed on both sides of the orientation azimuth, and the azimuths on each side are distributed in ascending order of angles between the azimuths and the orientation azimuth. For example, as shown in FIG. 5, the target rotation direction is still the clockwise direction, the center of the dial is the orientation azimuth of the virtual object 510, the first azimuths 520 are on the right side of the dial, and the dial is the second azimuths 530 are on the left side. A larger distance between a first azimuth or a second azimuth and the orientation azimuth indicates a larger angle between the first azimuth or the second azimuth and the orientation azimuth.

Figure 6:
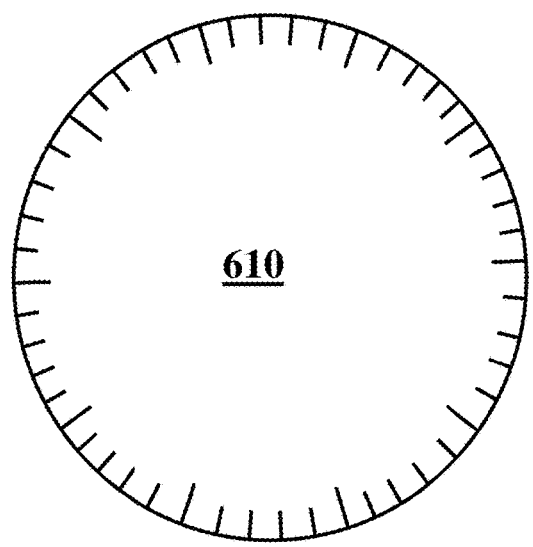
FIG. 6 is a schematic diagram of a circular dial at a normal viewing angle according to an embodiment of the present disclosure.

The form of the horizontal bar dial is compared with the form of a circular dial 610 at a normal viewing angle shown in FIG. 6. The circular dial at a normal viewing angle can reflect the azimuth situation when the virtual object is overlooked from top to bottom. However, the horizontal bar dial reflects the azimuth in the horizontal direction on the dial from the viewing angle of the virtual object, and can more really simulate a real character observing the azimuth situation of the virtual scene in the position of the virtual object.

In a possible implementation, the target horizontal bar dial may include a plurality of azimuth scales spaced at a target angle interval. The target angle interval may include a preset angle interval. In a possible implementation, a plurality of target azimuths may be further preset. In the target horizontal bar dial, the plurality of target azimuths are used as azimuth scales, so that the virtual object may communicate with other virtual objects through the target horizontal bar dial for the azimuth situation of the virtual scene. Specifically, the terminal may obtain a plurality of target azimuths of the plurality of azimuths, an angle interval between the plurality of target azimuths being a target angle interval, and the terminal may obtain the target horizontal bar dial by using the plurality of target azimuths as azimuth scales of the plurality of azimuths.

The target azimuth and the target angle interval may be preset by related personnel according to the azimuth of the virtual scene and the size of the terminal screen. For example, the target angle interval may be 15°, and the target azimuth may be 0°, 15°, 30°, . . . , 345°. Certainly, the target azimuth and target angle interval may alternatively be other angle values, and specific values of the target azimuth and the target angle interval are not limited in this embodiment of the present disclosure.

Figure 7:
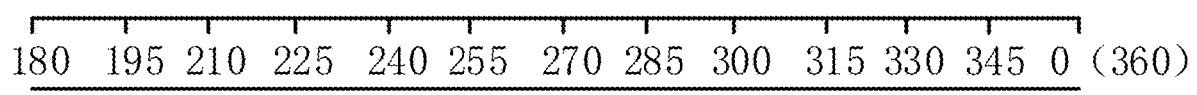
FIG. 7 is a schematic diagram of a target horizontal bar dial according to an embodiment of the present disclosure.

For example, the target angle is 90°, the target rotation direction is the clockwise direction, and the target angle interval is 15°. If the orientation azimuth of the virtual object is 270°, the plurality of azimuths obtained by the terminal are from 180° to 360° (0°). The terminal may obtain target azimuths of 180°, 195°, 210°, 225°, 240°, 255°, 270°, 285°, 300°, 315°, 330°, 345°, and 0° of the plurality of azimuths. The plurality of target azimuths are azimuth scales in the target horizontal bar dial, and the target horizontal bar dial may be shown in FIG. 7. In this embodiment of the present disclosure, 0° coincides with 360°. When 0° or 360° is displayed, description is made by using an example in which only 0° is displayed.

The foregoing steps 202 and 203 are actually a process of obtaining the target horizontal bar dial according to the orientation azimuth of the virtual object in the virtual scene. The target horizontal bar dial includes a plurality of azimuths centered on the orientation azimuth. The terminal generates the target horizontal bar dial according to the azimuths adjacent to the orientation azimuth of the virtual object, and can display the target horizontal bar dial later, so that the user can learn the position of the virtual object in the virtual scene, and an azimuth of a surrounding environment of the virtual object relative to the virtual object, that is, the azimuth situation of the virtual scene, through the target horizontal bar dial.

204. The terminal displays the target horizontal bar dial in a visual field picture of the virtual object. The visual field picture of the virtual object may include a visual field image of the virtual object.

After obtaining the target horizontal bar dial, the terminal may display the target horizontal bar dial in the visual field picture of the virtual object, to display the azimuth situation of the virtual scene, helping determine the moving direction and the position of the virtual object in the virtual scene when the virtual object moves in the virtual scene, thereby improving the display efficiency and the reference value of the virtual scene.

The visual field picture of the virtual object is a part or all of the virtual scene observed from the viewing angle of the virtual object. In a possible implementation, there may be a target display position of the target horizontal bar dial in the terminal, and the terminal may display the target horizontal bar dial on the target display position of the visual field picture of the virtual object. The target display position may be preset by a related technician, or may be adjusted by the user according to a usage habit of the user. For example, the target display position may be an upper area of the visual field picture of the virtual object. This is not specifically limited in this embodiment of the present disclosure.

In a possible implementation, the terminal may further display at least one azimuth name of the azimuths in the target horizontal bar dial in the visual field picture of the virtual object. In another implementation, the terminal may display a azimuth name of each of the azimuths in the target horizontal bar dial in the visual field picture of the virtual object.

In a possible implementation, the terminal may obtain the azimuth names of the target azimuths corresponding to the azimuth scales in the target horizontal bar dial, and display the azimuth names of the target azimuths on the corresponding azimuth scales. In a possible implementation, the terminal may further display prompt information of the orientation azimuth within a target range of the orientation azimuth of the virtual object, to give a prompt about which azimuth the virtual object is currently facing. The target range may be an area above the azimuth, an area below the azimuth, or an area where the azimuth is located. This is not limited in this embodiment of the present disclosure. The prompt information of the orientation azimuth may be text information, icon information, or special effect information. This is not specifically limited in this embodiment of the present disclosure. For example, the prompt information may be an arrow icon.

In a possible implementation, the azimuth name may be a degree value of the azimuth, for example, 240° or 240 may be displayed on an azimuth 240°. In a possible implementation, the azimuth name may alternatively be north, northeast, east, southeast, south, southwest, west, or northwest, so that the azimuth situation in a real scene may be simulated more really. For example, being due north is used as a preset azimuth and the target rotation direction is clockwise. Azimuth names of 0°, 45°, 90°, 135°, 180°, 225°, 270°, and 315° may be set to north, northeast, east, southeast, south, southwest, west, and northwest respectively. Correspondingly, if the plurality of target azimuths included in the target horizontal bar dial obtained currently by the terminal are 180°, 195°, 210°, 225°, 240°, 255°, 270°, 285°, 300°, 315°, 330°, 345°, and 0° (360°), when the terminal displays the target horizontal bar dial, the azimuth names displayed in the target horizontal bar dial may be south, 195, 210, southwest, 240, 255, west, 285, 300, northwest, 330, 345, and north.

In a possible implementation, the terminal may further display the target horizontal bar dial in the visual field picture of the virtual object according to target transparency, so as to prevent the virtual scene from being excessively blocked. The target transparency may be preset by a related technician, or may be adjusted by the user according to a usage habit of the user. This is not specifically limited in this embodiment of the present disclosure. For example, the target transparency may be 50% or 75%.

In a possible implementation, the target horizontal bar dial may include some azimuths adjacent to the orientation azimuth of the virtual object in the horizontal direction. For azimuths that are not displayed, the terminal may further display a positional relationship between an azimuth adjacent to an azimuth displayed in the target horizontal bar dial and the virtual object. For example, the positional relationship may be "left rear" or "right rear".

Figure 8:
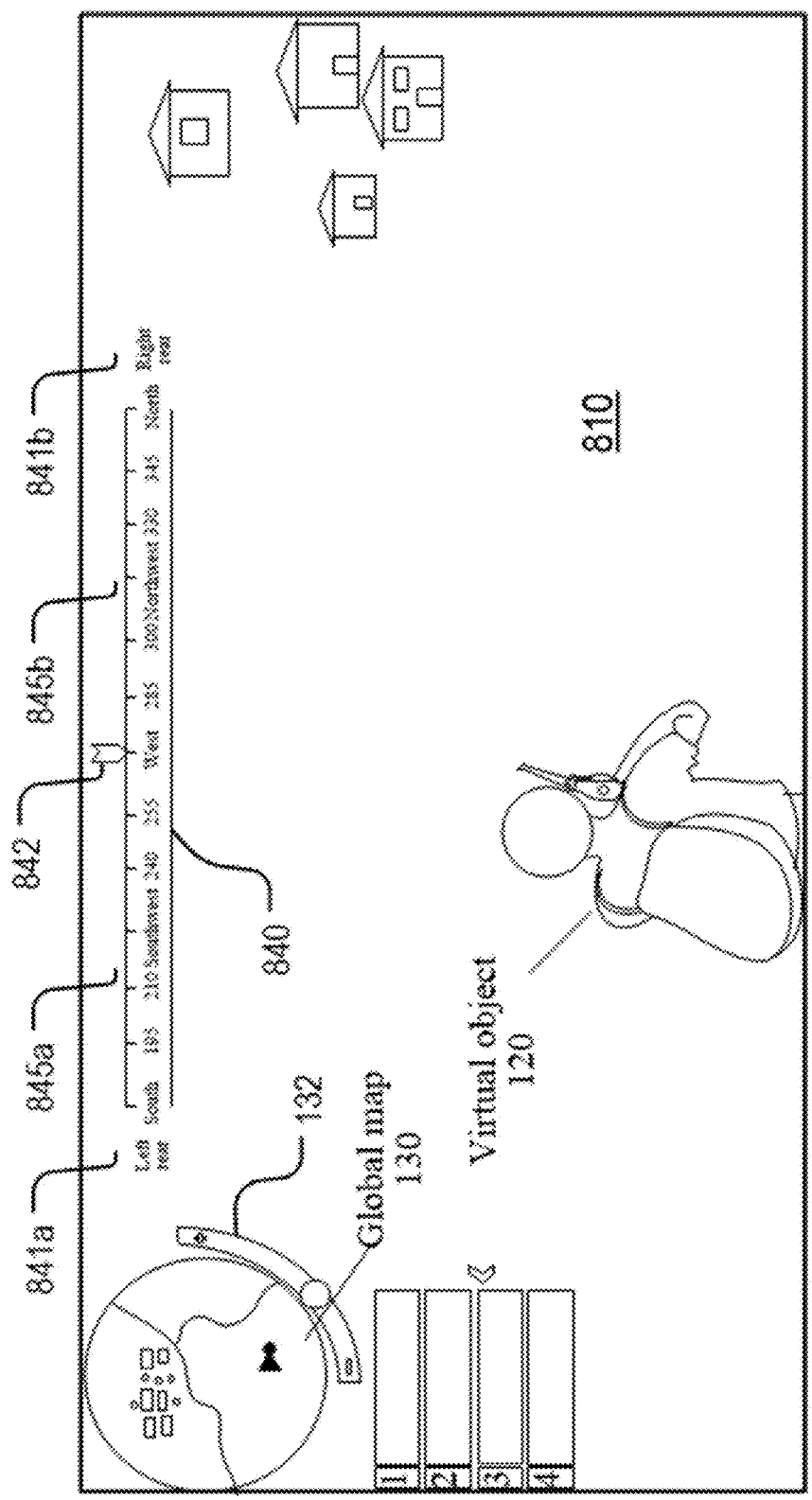
FIG. 8 is a schematic diagram of a terminal interface according to an embodiment of the present disclosure.
Figure 9:
FIG. 9 is a diagram of an actual interface of a terminal according to an embodiment of the present disclosure.

For example, as shown in FIG. 8, the terminal may display the target horizontal bar dial 840 on an upper area of the visual field picture 810 of the virtual object 120. The azimuth names of the plurality of target azimuths are displayed in the target horizontal bar dial. For example, "left rear" 841a and "right rear" 841b may be displayed on both sides of the target horizontal bar dial. An arrow icon 842 may be displayed above an orientation azimuth "West" 842 (an azimuth degree of 270 is no shown) of the virtual object. The user can learn that the virtual object is facing west through the target horizontal bar dial. Azimuths between south (180) and west (270) are on the left side 845a of the virtual object, azimuths between west (270) and north (0 or 360) are on the right side 845b of the virtual object, azimuths on the left side of the south are the left rear of the virtual object, and azimuths on the right side of the north are the right rear of the virtual object. In a specific example, an actual interface is shown in FIG. 9.

Since the target horizontal bar dial is centered on the orientation azimuth of the virtual object, when the orientation azimuth of the virtual object changes, the target horizontal bar dial also changes accordingly. Specifically, the orientation azimuth of the virtual object usually changes by adjusting the viewing angle of the virtual scene. Correspondingly, the target horizontal bar dial changes as a viewing angle of the virtual scene changes. When detecting the viewing angle adjustment operation, the terminal may adjust the viewing angle of the virtual scene according to the viewing angle adjustment operation.

After detecting that the orientation azimuth of the virtual object changes, the terminal may perform the foregoing steps 201 to 204, to obtain a new orientation azimuth of the virtual object, and obtain and display the adjusted target horizontal bar dial according to the new orientation azimuth. When rendering and displaying the visual field picture of the virtual object, the terminal may first obtain a visual field picture of a next frame according to a previous frame and a detected touch operation. Each frame is a scene picture that can be observed from the current viewing angle of the virtual scene. The frame refers to a still picture. In the foregoing process of adjusting the viewing angle, the terminal may calculate an orientation azimuth of the virtual object in the next frame according to an orientation azimuth of the virtual object in the previous frame and a detected viewing angle adjustment operation, and obtain the target horizontal bar dial according to the orientation azimuth in the next frame. Since the target horizontal bar dial changes as the viewing angle adjustment operation is performed, when the target horizontal bar dial is displayed, the user may observe the effect that the target horizontal bar dial is smoothly dragged as the viewing angle adjustment operation is performed, and the target horizontal bar dial no longer changes when the viewing angle no longer changes. In this case, the center of the target horizontal bar dial is still the orientation azimuth of the virtual object. A drag speed displayed by the target horizontal bar dial is positively correlated with an operating speed of the viewing angle adjustment operation. A larger operating speed indicates a larger drag speed. For example, the viewing angle adjustment operation is a slide operation, and the operating speed may refer to a slide distance of the slide operation within a unit time.

Figure 10:
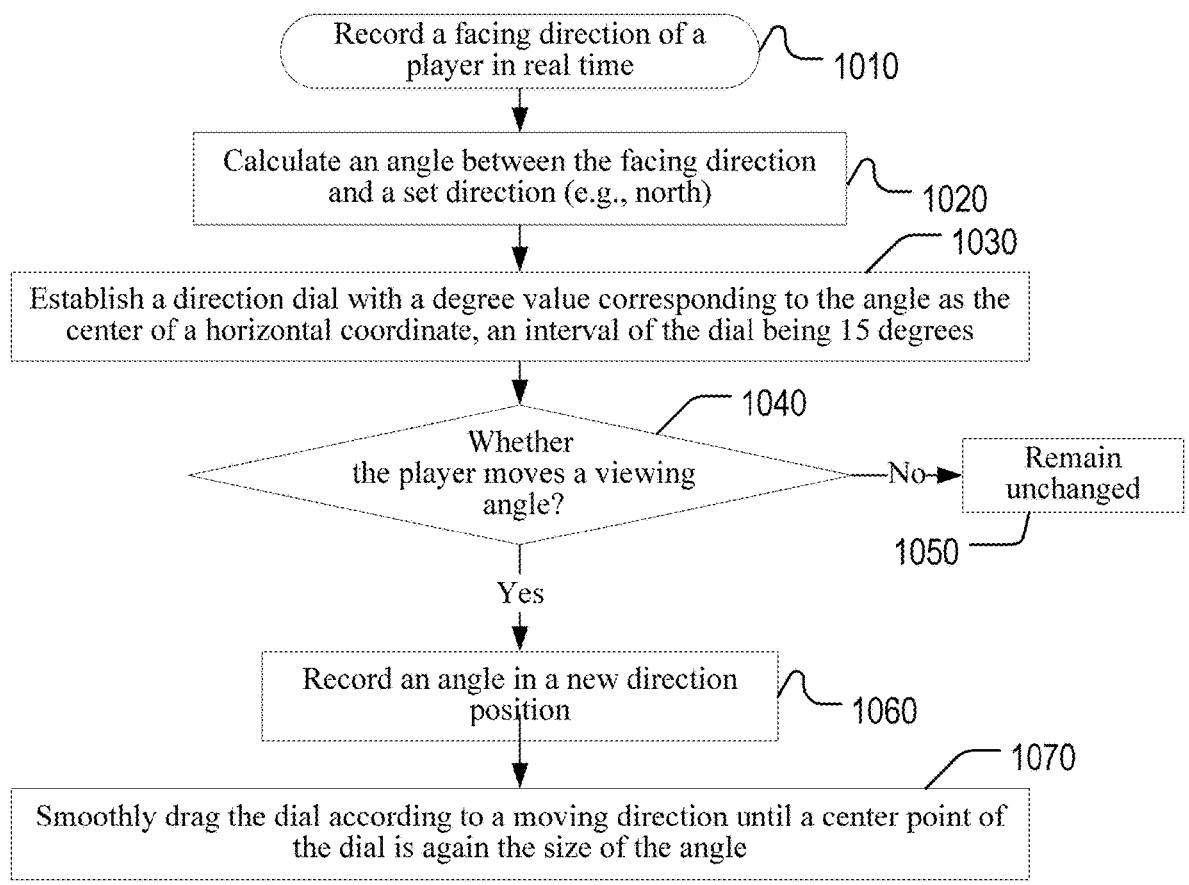
FIG. 10 is a flowchart of a method for displaying an azimuth in a virtual scene according to an embodiment of the present disclosure.

For example, as shown in FIG. 10, in a video game scene, the terminal may record a facing direction of a player in real time (at 1010), that is, the terminal may record an orientation of the virtual object in real time. The terminal may calculate an angle between the facing direction and a set direction (at 1020), that is, the terminal may obtain an orientation azimuth of the virtual object, for example, the set direction is north. The terminal may establish a direction dial with a degree value corresponding to the angle as the center of a horizontal coordinate, and an interval of the dial is 15 degrees (at 1030). The degree value corresponding to the angle is the orientation azimuth of the virtual object, the direction dial is the target horizontal bar dial, and 15 degrees are the target angle interval. The terminal may display the direction dial and determine whether the player moves the viewing angle (at 1040). If not, the terminal may keep the direction dial unchanged (at 1050). If yes, the terminal may record an angle in a new direction position (at 1060), and smoothly drag the dial according to the moving direction of the viewing angle until a center point of the dial is again the size of the angle (at 1070). That is, the target horizontal bar dial changes as the viewing angle changes.

205. The terminal obtains, in a case that a target position is detected, an azimuth of the target position relative to the virtual object, the target position being a position of a position identifier in a global map, or the target position being a position of a target area. The azimuth of the target position relative to the virtual object may be the target position azimuth.

The position identifier of the target position may be an identifier of a selected position in the global map. The target position or the position identifier of the target position may be selected by the user of the terminal in the global map, or be selected by another user in the global map and sent to the terminal through a server. This is not limited in this embodiment of the present disclosure. The selected position may be selected through a selection operation. The selection operation may be an operation triggered by a touch event of the user's finger, or an operation triggered by a click event of a mouse or another input device. The target area may be an area selected by the user or a target area in the virtual scene. This is not limited in this embodiment of the present disclosure.

For example, in a video game scene, the target position may be a position point marked on the global map by a user or a teammate, and the position point may be displayed on the global map as an identifier of the user who marks the position point. Alternatively, in some shooting games, the target area may be a safe area or a safe zone. The safe area/zone an area/zone in the virtual scene. When the virtual object is inside the safe area/zone, a health index of the virtual object is better, and when the virtual object is outside the safe area/zone, the health index of the virtual object becomes worse and worse and the health index may be lowered. When the health index of the virtual object drops to zero, the virtual object is eliminated from the program/game.

When detecting the target position, the terminal may obtain an azimuth of the target position relative to the virtual object, to display the azimuth situation of the target position, helping determine the moving direction more accurately when the virtual object moves to the target position, thereby improving the display efficiency and the reference value of the virtual scene. Specifically, the terminal may obtain a connection line direction between the target position and the virtual object and obtain, by using the connection line direction as a target direction, a horizontal angle formed through rotation from the target direction to a target direction line according to a target rotation direction. The horizontal angle is the azimuth of the target position relative to the virtual object.

When the target position is a position of the position identifier in the global map, the terminal may obtain a coordinate of the target position and a coordinate of the virtual object, and obtain the foregoing horizontal angle by using a connection line direction between the two coordinates as the target direction. When the target position is a position of the target area, the terminal may obtain a center point of the target area. Then, a coordinate of the center point of the target area and a coordinate of the virtual object may be obtained; and the foregoing horizontal angle may be obtained by using a connection line direction from the coordinate of the center point of the target area to the coordinate of the virtual object as the target direction.

Figure 11:
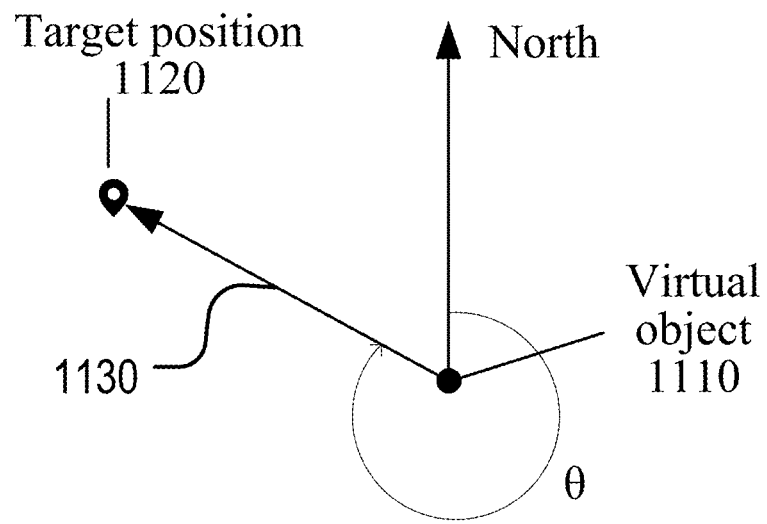
FIG. 11 is a schematic diagram of a method for obtaining an azimuth of a target position relative to a virtual object according to an embodiment of the present disclosure.
Figure 12:
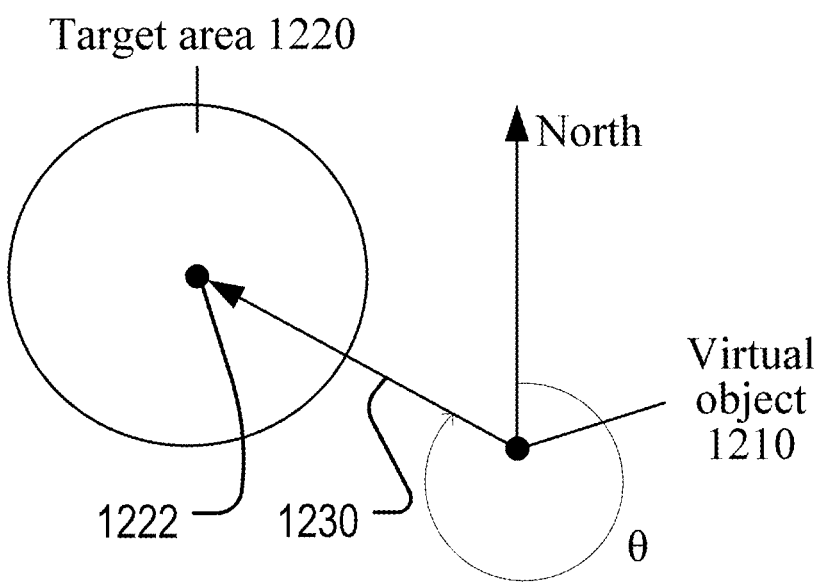
FIG. 12 is a schematic diagram of a method for obtaining an azimuth of a target position relative to a virtual object according to an embodiment of the present disclosure.

For example, as shown in FIG. 11, the target position 1120 is the position of the position identifier in the global map, and the target direction 1130 is a direction in which the virtual object 1110 points to the position of the position identifier. As shown in FIG. 12, the target position 1222 is a position inside the target area 1220. For example, the target position 1222 may be a center point of the target area 1220. The target direction 1230 is a direction in which the virtual object 1210 points to the center point of the target area.

206. The terminal displays, in a case that the target horizontal bar dial includes the azimuth of the target position relative to the virtual object, prompt information of the target position within a target range of the azimuth in the target horizontal bar dial.

After obtaining the azimuth of the target position relative to the virtual object, the terminal may determine whether the azimuth is in azimuths included in the target horizontal bar dial. If yes, the terminal may further display the prompt information within the target range of the azimuth in the target horizontal bar dial. If not, the terminal does not need to display the prompt information of the target position. The terminal gives a prompt about the azimuth of the target position, so that the user can more intuitively and accurately learn the positional relationship between the target position and the virtual object, thereby improving the display efficiency and the reference value of the virtual scene.

The target range may be a surrounding area of the azimuth, for example, may be an area above the azimuth, or may be an area below the azimuth. The prompt information of the target position may be text information, icon information, or special effect information. In a possible implementation, when the type of the target position is different, the prompt information of the target position may also be different. That is, the prompt information of the target position corresponds to the type of the target position. For example, when the target position is the position of the position identifier in the global map, the prompt information may be a water-drop-shaped icon. When the target position is the position of the target area, the prompt information may be text information. Certainly, the prompt information may alternatively be another type of information. In a possible implementation, the target range and the prompt information of the target position may alternatively be set by the user according to a usage habit of the user. A specific position of the target range and a specific form of the prompt information are not limited in this embodiment of the present disclosure.

In a possible implementation, different identifiers may be preset for different virtual objects. When the target position is the position of the position identifier in the global map, a style of the position identifier and a style of the prompt information of the target position may correspond to an identifier of a selected operation performer of the position identifier. For example, different virtual objects may correspond to different colors, and a color of the position identifier and a color of the prompt information of the target position may correspond to the virtual object. For example, a color corresponding to a virtual object is yellow. When the position identifier is marked by the virtual object, a display color of the position identifier in the global map may be yellow, and a color of the prompt information of the target position may also be yellow. For another example, different virtual objects may correspond to different numbers. For example, a number corresponding to a virtual object is 1. When the position identifier is marked by the virtual object, a display style of the position identifier in the global map may be 1, and a display style of the prompt information of the target position may also be 1. The identifier may be the foregoing color or number, or may be an icon shape or a special effect. This is not limited in this embodiment of the present disclosure.

When detecting a plurality of target positions, the terminal may further perform the foregoing steps 205 and 206, to display all of the plurality of target positions in the visual field picture of the virtual object. The plurality of target positions may be distinguished according to the foregoing styles. Certainly, the plurality of target positions may alternatively be not distinguished. This is not specifically limited in this embodiment of the present disclosure.

In a possible implementation, when displaying the prompt information of the target position, the terminal may further obtain a distance between the target position and the virtual object, and display the distance within the target range of the azimuth in the target horizontal bar dial. In this way, the user can learn not only the azimuth of the target position, but also the distance between the target position and the virtual object. Therefore, the user can learn the azimuth of the target position and how far the target position is according to the foregoing display information, so that the user can control the virtual object to move according to the foregoing display information, thereby improving the display efficiency and the reference value of the virtual scene.

For example, in a video game scene, the user can see the virtual scene through the visual field picture displayed on the terminal, learn a current orientation azimuth of the virtual object through the foregoing target horizontal bar dial, and learn an azimuth of another target position or a surrounding environment. For another example, in a team game, the user can further learn a target position selected by another user and communicate with the another user about an azimuth of a specific position relative to the user, so that the another user can estimate an azimuth of the specific position relative to the another user based on the azimuth reported by the user, thereby implementing azimuth information or position sharing in the game, making an azimuth expressed by the user clearer, and effectively improving the user experience.

Figure 13:
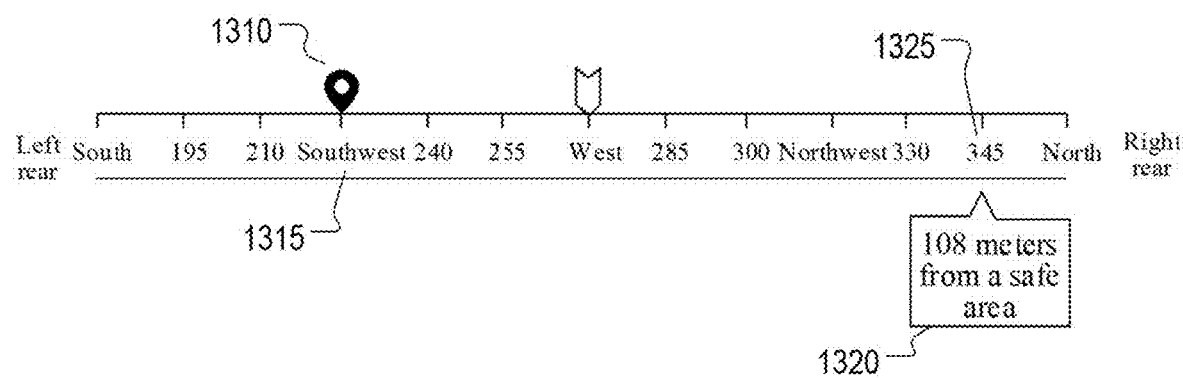
FIG. 13 is a schematic diagram of a target horizontal bar dial according to an embodiment of the present disclosure.
Figure 14:
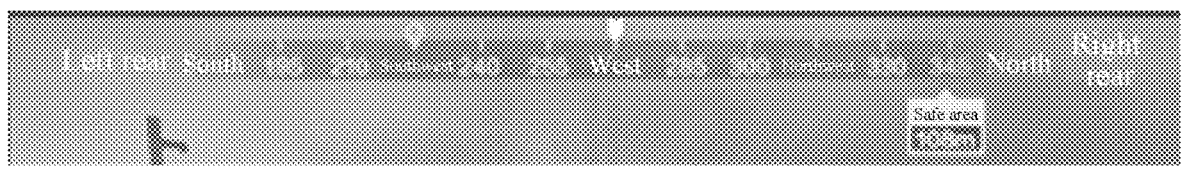
FIG. 14 is a schematic diagram of a display effect of a target horizontal bar dial according to an embodiment of the present disclosure.
Figure 15:
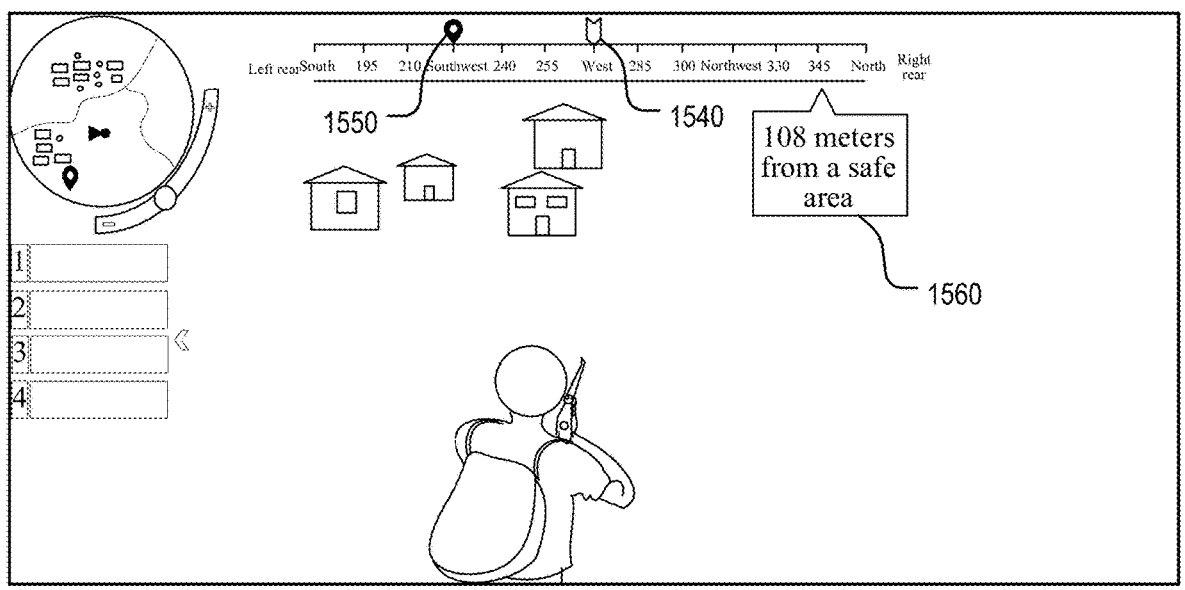
FIG. 15 is a schematic diagram of a terminal interface according to an embodiment of the present disclosure.
Figure 16:
FIG. 16 is a diagram of an actual interface of a terminal according to an embodiment of the present disclosure.

For example, as shown in FIG. 13, the terminal may detect three target positions, an azimuth of a first target position relative to the virtual object is southwest (at 225 degree) 1315, an azimuth of a second target position relative to the virtual object is at 75 degree, and an azimuth of a third target position relative to the virtual object is at 345 degree (1325). The first target position and the second target position are positions of the position identifiers in the global map, and the third target position is the position of the target area. In FIG. 13, the target horizontal bar dial includes azimuths of 180 to 360 (0), and an azimuth southwest and 345 are included in the target horizontal bar dial, so that the terminal may display the prompt information of the position identifier in a target range (for example, above) of the azimuth southwest 1310, and display the prompt information of the target area in a target range (for example, below) of the azimuth 345 degree (1320). An azimuth 75 is not in the target horizontal bar dial, so that the terminal does not display prompt information corresponding to the azimuth in the visual field picture. In a specific example, an actual display effect is shown in FIG. 14. In a schematic diagram of an interface shown in FIG. 15, the terminal may display the target horizontal bar dial in an upper area of the visual field picture, use an arrow icon 1540 to indicate that the orientation azimuth of the virtual object is west, display the prompt information of the position identifier 1550 above the azimuth southwest, display the prompt information of the target area 1560 below the azimuth 345, and display a distance to the target area. In a specific example, a diagram of an actual interface is shown in FIG. 16.

If the position of the target position changes, or the position of the virtual object changes, the azimuth of the target position relative to the virtual object changes. The terminal may alternatively perform the foregoing steps 205 and 206 when the target position is updated, to update the prompt information of the target position in the visual field picture of the virtual object. Similar to the foregoing step 204, when the orientation azimuth of the virtual object changes, that is, the target horizontal bar dial changes, but the azimuth of the target position relative to the virtual object does not change, the terminal may further show, in a manner of calculating a visual field picture of each frame in real time, that the prompt information and the corresponding azimuth of the target position are unchanged, but the target position moves as the target horizontal bar dial is smoothly dragged.

Figure 17:
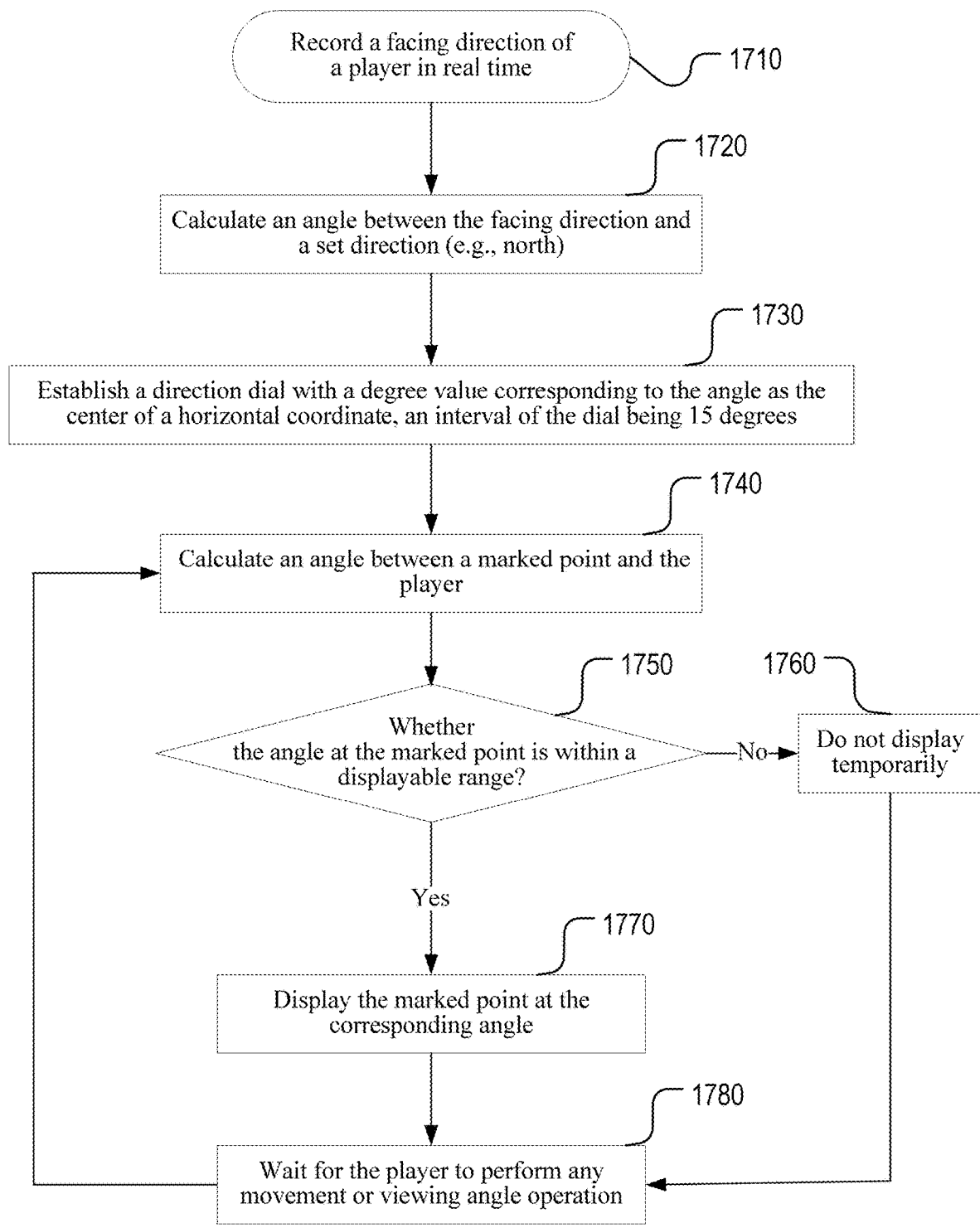
FIG. 17 is a flowchart of a method for displaying an azimuth in a virtual scene according to an embodiment of the present disclosure.

For example, as shown in FIG. 17, in a video game scene, the terminal may record a facing direction of a player in real time (at 1710), then calculate an angle between the facing direction and a set direction (at 1720), and establish a direction dial with a degree value corresponding to the angle as the center of a horizontal coordinate (at 1730). An interval of the dial is 15 degrees. The foregoing steps are similar to the steps in FIG. 10. A marked point is used as an example for description herein. When the target position is detected, the terminal may calculate an angle between the marked point and the player (at 1740), and this is the foregoing step of obtaining the azimuth of the target position relative to the virtual object. The terminal may determine whether the angle at the marked point is within a displayable range (at 1750). If not, the terminal temporarily does not display the marked point (at 1760), and if yes, the terminal displays the marked point at the corresponding angle (at 1770). That is, the terminal determines whether the azimuth of the target position relative to the virtual object is in the target horizontal bar dial. If not, the terminal does not display the prompt information in the visual field picture, and if yes, the terminal displays the prompt information in the corresponding azimuth. The terminal may wait for the player to perform any movement or viewing angle operation (at 1780). When detecting an operation, the terminal may perform the foregoing angle calculation and determine whether to display the operation.

In a possible implementation, based on the foregoing target horizontal bar dial, the terminal may further provide a viewing angle adjustment operation mode: a flick operation is performed on the target horizontal bar dial, to adjust a viewing angle, thereby improving the convenience and flexibility of the operation. In another implementation, the flick operation may be a swipe or slide operation performed on the target horizontal bar dial to adjust a viewing angle of the virtual object. The flick operation is described below as an example, the embodiment may use a swipe or slide operation to replace the slick operation.

Specifically, the terminal continuously adjusts, in a case that a flick operation on the target horizontal bar dial is detected, a viewing angle according to the flick operation. The flick operation may be a slide operation substantially, and the slide operation acts on the position of the target horizontal bar dial, to flick the target horizontal bar dial, so that another azimuth is displayed in the center of the target horizontal bar dial. Correspondingly, the terminal may adjust the viewing angle according to the azimuth change corresponding to the flick operation, that is, determine the angle change of the viewing angle according to the angle change, to make the adjusted orientation azimuth of the virtual object correspond to the azimuth displayed in the center of the target horizontal bar dial. In a possible implementation, a viewing angle adjustment speed is positively correlated with a flick speed of the flick operation. A larger flick speed indicates a larger viewing angle adjustment speed. In another possible implementation, a viewing angle adjustment angle is positively correlated with a flick distance of the flick operation, that is, is positively correlated with an azimuth change amount corresponding to the flick operation. A larger flick distance and a larger azimuth change amount indicate a larger viewing angle adjustment angle. In a continuous process of the flick operation, the terminal continuously adjusts the viewing angle according to the flick operation, to ensure that the orientation azimuth of the virtual object corresponds to the azimuth displayed in the center of the target horizontal bar dial in each frame.

For example, the orientation azimuth of the virtual object is west. When detecting the flick operation, the terminal learns, through calculation, that the azimuth displayed in the center of the target horizontal bar dial in a next frame is 265, so that the terminal adjusts the viewing angle to make the orientation azimuth of the virtual object be 265. The flick operation continues to be performed. The terminal learns, through calculation, that the azimuth displayed in the center of the target horizontal bar dial in a next frame of the next frame is 256, that is, an arrow icon is displayed at a position corresponding to an azimuth 256 between the azimuths 240 and 265, so that the terminal adjusts the viewing angle to make the orientation azimuth of the virtual object be 256. When the flick operation ends, the terminal stops adjusting the viewing angle.

207. The terminal cancels, in a case of detecting that the target position is deleted, the display of the prompt information of the corresponding target position, which was displayed within the target range of the corresponding azimuth in the target horizontal bar dial. In another implementation, when the target position is deleted, the terminal stops displaying the prompt information of the corresponding target position.

The user may perform a position identifier deletion operation in the global map. When detecting the position identifier deletion operation, the terminal may delete the position identifier from the global map. When detecting that the position identifier is deleted, the terminal performs a display canceling operation on the prompt information displayed within the target range of the corresponding azimuth in the target horizontal bar dial in a previous visual field picture.

In the embodiments of the present disclosure, an orientation azimuth of a virtual object is obtained, then a plurality of azimuths centered on the orientation azimuth are obtained according to the orientation azimuth, a target horizontal bar dial is generated, and the target horizontal bar dial is displayed in a visual field picture of the virtual object, so that the azimuth situation of the virtual scene based on the virtual object is displayed, thereby improving the display efficiency of the virtual scene, and the azimuth reference is provided for the virtual object, thereby improving the reference value of display information of the virtual scene.

Further, in this embodiment of the present disclosure, the azimuth of the target position relative to the virtual object is obtained, and the prompt information of the target position is displayed within the target range of the azimuth, so that the positional relationship between the target position and the virtual object is displayed more intuitively and accurately, thereby improving the display efficiency and the reference value of the virtual scene.

Further, in this embodiment of the present disclosure, an operation mode for adjusting the viewing angle through the flick operation on the target horizontal bar dial is provided, thereby improving the convenience and flexibility of the operation.

An optional embodiment of the present disclosure may be formed by using any combination of all the foregoing optional technical solutions, and details are not described herein.

Figure 18:
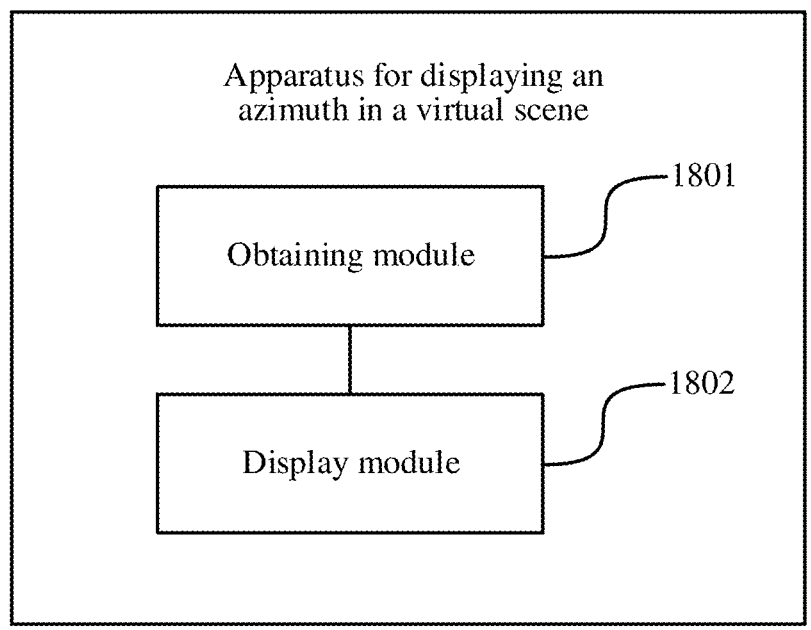
FIG. 18 is a schematic structural diagram of an apparatus for displaying an azimuth in a virtual scene according to an embodiment of the present disclosure.

FIG. 18 is a schematic structural diagram of an apparatus for displaying an azimuth in a virtual scene according to an embodiment of the present disclosure. Referring to FIG. 18, the apparatus includes:

an obtaining module 1801, configured to obtain an orientation azimuth of a virtual object in the virtual scene;

the obtaining module 1801 being further configured to obtain a plurality of azimuths, angles between the azimuths and the orientation azimuth being less than or equal to a target angle, the plurality of azimuths including first azimuths and second azimuths, there being angles between the first azimuths and the orientation azimuth in a target rotation direction, there being angles between the second azimuths and the orientation azimuth in an opposite direction of the target rotation direction, and the target rotation direction being clockwise or counterclockwise; and the obtaining module 1801 being further configured to symmetrically distribute the first azimuths and the second azimuths of the plurality of azimuths centered on the orientation azimuth on both sides of the orientation azimuth, to obtain a target horizontal bar dial, a plurality of azimuths on each side of the orientation azimuth being distributed in ascending order of angles; and a display module 1802, configured to display the target horizontal bar dial in a visual field picture of the virtual object.

In a possible implementation, the obtaining module 1801 is further configured to:

obtain a plurality of azimuths, angles between the azimuths and the orientation azimuth being less than or equal to a target angle, the plurality of azimuths including first azimuths and second azimuths, there being angles between the first azimuths and the orientation azimuth in a target rotation direction, there being angles between the second azimuths and the orientation azimuth in an opposite direction of the target rotation direction, and the target rotation direction being clockwise or counterclockwise; and symmetrically distribute the first azimuths and the second azimuths of the plurality of azimuths centered on the orientation azimuth on both sides of the orientation azimuth, to obtain a target horizontal bar dial, a plurality of azimuths on each side of the orientation azimuth being distributed in ascending order of angles.

In a possible implementation, the obtaining module 1801 is further configured to:

obtain a plurality of target azimuths of the plurality of azimuths, an angle interval between the plurality of target azimuths being a target angle interval; and obtain the target horizontal bar dial by using the plurality of target azimuths as azimuth scales of the plurality of azimuths.

In a possible implementation, the display module 1802 is further configured to display azimuth names of the azimuths in the target horizontal bar dial in the visual field picture of the virtual object.

In a possible implementation, the display module 1802 is further configured to display the target horizontal bar dial in the visual field picture of the virtual object according to target transparency.

In a possible implementation, the display module 1802 is further configured to display a positional relationship between an azimuth adjacent to an azimuth displayed in the target horizontal bar dial and the virtual object.

In a possible implementation, the obtaining module 1801 is further configured to obtain, in a case that a target position is detected, an azimuth of the target position relative to the virtual object, the target position being a position of a position identifier in a global map, or the target position being a position of a target area; and the display module 1802 is further configured to display, in a case that the target horizontal bar dial includes the azimuth of the target position relative to the virtual object, prompt information of the target position within a target range of the azimuth in the target horizontal bar dial.

In a possible implementation, the obtaining module 1801 is further configured to: obtain a distance between the target position and the virtual object; and the display module 1802 is further configured to display the distance within the target range of the azimuth in the target horizontal bar dial.

In a possible implementation, the display module 1802 is further configured to cancel, in a case of detecting that the target position is deleted, display of the prompt information of the target position within the target range of the azimuth in the target horizontal bar dial.

In a possible implementation, the target horizontal bar dial changes as a viewing angle of the virtual scene changes.

In a possible implementation, the apparatus further includes:

a viewing angle adjustment module, configured to continuously adjust, in a case that a flick operation on the target horizontal bar dial is detected, a viewing angle according to the flick operation.

The apparatus provided in the embodiments of the present disclosure obtains an orientation azimuth of a virtual object, then obtains a plurality of azimuths centered on the orientation azimuth according to the orientation azimuth, generates a target horizontal bar dial, and displays the target horizontal bar dial in a visual field picture of the virtual object, so that the azimuth situation of the virtual scene based on the virtual object is displayed, thereby improving the display efficiency of the virtual scene, and the azimuth reference is provided for the virtual object, thereby improving the reference value of display information of the virtual scene.

When the apparatus for displaying an azimuth in a virtual scene according to the foregoing embodiments displays an azimuth in a virtual scene, only divisions of the foregoing functional modules are described by using an example. During actual application, the foregoing functions may be allocated to and completed by different functional modules according to requirements, that is, the internal structure of the apparatus is divided into different functional modules, to complete all or some of the foregoing described functions. In addition, the apparatus for displaying an azimuth in a virtual scene provided in the foregoing embodiments is based on the same concept as the method for displaying an azimuth in a virtual scene in the foregoing embodiments. For details of a specific implementation process, refer to the method embodiments. Details are not described herein again.

Figure 19:
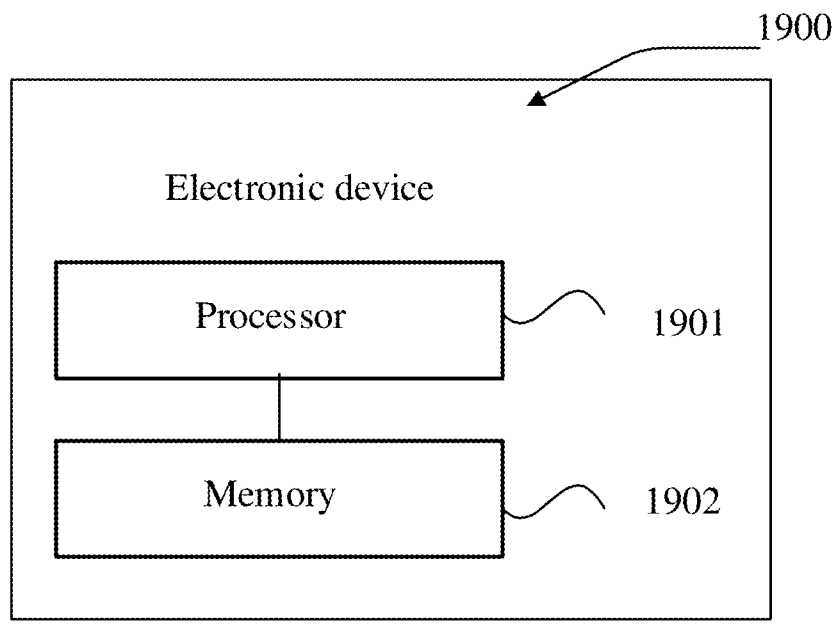
FIG. 19 is a schematic structural diagram of an electronic device 1900 according to an embodiment of the present disclosure.

FIG. 19 is a schematic structural diagram of an electronic device 1900 according to an embodiment of the present disclosure. The electronic device 1900 may vary greatly due to different configurations or performance, and may include one or more processors (for example, central processing units (CPU)) 1901 and one or more memories 1902. The memory 1902 stores at least one instruction, and the at least one instruction is loaded and executed by the processor 1901 to implement the method for displaying an azimuth in a virtual scene provided in the foregoing method embodiments. The method may include the following steps:

obtaining an orientation azimuth of a virtual object in the virtual scene; obtaining a plurality of azimuths, angles between the azimuths and the orientation azimuth being less than or equal to a target angle, the plurality of azimuths including first azimuths and second azimuths, there being angles between the first azimuths and the orientation azimuth in a target rotation direction, there being angles between the second azimuths and the orientation azimuth in an opposite direction of the target rotation direction, and the target rotation direction being clockwise or counterclockwise; symmetrically distributing the first azimuths and the second azimuths of the plurality of azimuths centered on the orientation azimuth on both sides of the orientation azimuth, to obtain a target horizontal bar dial, a plurality of azimuths on each side of the orientation azimuth being distributed in ascending order of angles; and displaying the target horizontal bar dial in a visual field picture of the virtual object.

In a possible implementation, the instruction is loaded and executed by the processor 1901 to implement the method operations: obtaining a plurality of target azimuths of the plurality of azimuths, an angle interval between the plurality of target azimuths being a target angle interval; and obtaining the target horizontal bar dial by using the plurality of target azimuths as azimuth scales of the plurality of azimuths.

In a possible implementation, the instruction is loaded and executed by the processor 1901 to implement the method operation: displaying azimuth names of the azimuths in the target horizontal bar dial in the visual field picture of the virtual object.

In a possible implementation, the instruction is loaded and executed by the processor 1901 to implement the method operation: displaying the target horizontal bar dial in the visual field picture of the virtual object according to target transparency.

In a possible implementation, the instruction is loaded and executed by the processor 1901 to implement the method operation: displaying a positional relationship between an azimuth adjacent to an azimuth displayed in the target horizontal bar dial and the virtual object.

In a possible implementation, the instruction is loaded and executed by the processor 1901 to implement the method operations: obtaining, in a case that a target position is detected, an azimuth of the target position relative to the virtual object, the target position being a position of a position identifier in a global map, or the target position being a position of a target area; and displaying, in a case that the target horizontal bar dial includes the azimuth of the target position relative to the virtual object, prompt information of the target position within a target range of the azimuth in the target horizontal bar dial.

In a possible implementation, the instruction is loaded and executed by the processor 1901 to implement the method operations: obtaining a distance between the target position and the virtual object; and displaying the distance within the target range of the azimuth in the target horizontal bar dial.

In a possible implementation, the instruction is loaded and executed by the processor 1901 to implement the method operation: canceling, in a case of detecting that the target position is deleted, display of the prompt information of the target position within the target range of the azimuth in the target horizontal bar dial.

In a possible implementation, the target horizontal bar dial changes as a viewing angle of the virtual scene changes.

In a possible implementation, the instruction is loaded and executed by the processor 1901 to implement the method operation: continuously adjusting, in a case that a flick operation on the target horizontal bar dial is detected, a viewing angle according to the flick operation.

Certainly, the electronic device 1900 may further include components such as a wired or wireless network interface, a keyboard, and an input/output interface, to facilitate the input/output. The electronic device 1900 may further include another component configured to implement functions of a device, and details are not described herein again.

In an exemplary embodiment, a computer-readable storage medium such as a memory including an instruction is further provided. The instruction may be executed by a processor in a terminal, to complete the method for displaying an azimuth in a virtual scene in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

Specifically, the method for displaying an azimuth in a virtual scene may include the following steps: obtaining an orientation azimuth of a virtual object in the virtual scene; obtaining a plurality of azimuths, angles between the azimuths and the orientation azimuth being less than or equal to a target angle, the plurality of azimuths including first azimuths and second azimuths, there being angles between the first azimuths and the orientation azimuth in a target rotation direction, there being angles between the second azimuths and the orientation azimuth in an opposite direction of the target rotation direction, and the target rotation direction being clockwise or counterclockwise; symmetrically distributing the first azimuths and the second azimuths of the plurality of azimuths centered on the orientation azimuth on both sides of the orientation azimuth, to obtain a target horizontal bar dial, a plurality of azimuths on each side of the orientation azimuth being distributed in ascending order of angles; and displaying the target horizontal bar dial in a visual field picture of the virtual object.

In a possible implementation, the instruction is loaded and executed by the processor 1901 to implement the following method operations: obtaining a plurality of target azimuths of the plurality of azimuths, an angle interval between the plurality of target azimuths being a target angle interval; and obtaining the target horizontal bar dial by using the plurality of target azimuths as azimuth scales of the plurality of azimuths.

In a possible implementation, the instruction is loaded and executed by the processor to implement the method operation: displaying azimuth names of the azimuths in the target horizontal bar dial in the visual field picture of the virtual object.

In a possible implementation, the instruction is loaded and executed by the processor to implement the method operation: displaying the target horizontal bar dial in the visual field picture of the virtual object according to target transparency.

In a possible implementation, the instruction is loaded and executed by the processor to implement the method operation: displaying a positional relationship between an azimuth adjacent to an azimuth displayed in the target horizontal bar dial and the virtual object.

In a possible implementation, the instruction is loaded and executed by the processor to implement the method operations: obtaining, in a case that a target position is detected, an azimuth of the target position relative to the virtual object, the target position being a position of a position identifier in a global map, or the target position being a position of a target area; and displaying, in a case that the target horizontal bar dial includes the azimuth of the target position relative to the virtual object, prompt information of the target position within a target range of the azimuth in the target horizontal bar dial.

In a possible implementation, the instruction is loaded and executed by the processor to implement the method operations: obtaining a distance between the target position and the virtual object; and displaying the distance within the target range of the azimuth in the target horizontal bar dial.

In a possible implementation, the instruction is loaded and executed by the processor to implement the method operation: canceling, in a case of detecting that the target position is deleted, display of the prompt information of the target position within the target range of the azimuth in the target horizontal bar dial.

In a possible implementation, the target horizontal bar dial changes as a viewing angle of the virtual scene changes.

In a possible implementation, the instruction is loaded and executed by the processor to implement the method operation: continuously adjusting, in a case that a flick operation on the target horizontal bar dial is detected, a viewing angle according to the flick operation.

A person of ordinary skill in the art may understand that all or some of the steps of the foregoing embodiments may be implemented by using hardware, or may be implemented by a program instructing related hardware. The program may be stored in a computer-readable storage medium. The above-mentioned computer-readable storage medium may be a read-only memory, a magnetic disk, an optical disc, or the like.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for displaying an azimuth in a virtual scene, the method comprising:
    obtaining, by a device comprising a memory storing instructions and a processor in communication with the memory, an orientation azimuth of a virtual object in a virtual scene;
    obtaining, by the device, a plurality of azimuths, angles between the plurality of azimuths and the orientation azimuth being no larger than a preset angle, the plurality of azimuths comprising first azimuths and second azimuths;

symmetrically distributing, by the device, the first azimuths and the second azimuths centered and on two sides of the orientation azimuth to obtain a target horizontal bar dial;

displaying, by the device, the target horizontal bar dial in a visual field image of the virtual object;

in response to a target position being detected, obtaining, by the device, a target position azimuth relative to the virtual object, the target position corresponding to a position identifier in a global map or a target area, the position identifier being marked by a user or a teammate in the global map;

in response to the target horizontal bar dial comprising the target position azimuth, displaying, by the device, prompt information of the target position within a target range of the target position azimuth in the target horizontal bar dial, the prompt information comprising text information corresponding to the position identifier, a position of the prompt information on the target horizontal bar dial corresponding to a position of the position identifier in the global map, wherein a color of the position identifier and a color of the prompt information are selected according to the virtual object;

in response to a flick operation, moving, by the device, the target horizontal bar dial according to the flick operation, a moving speed of the target horizontal bar dial being positively correlated with a flick speed of the flick operation, a moving distance of the target horizontal bar dial being positively correlated with a flick distance of the flick operation, and the flick operation acting on a position of the target horizontal bar dial to flick the target horizontal bar dial;

obtaining, by the device, a distance between the target position and the virtual object; and displaying, by the device, the distance in text within the target range of the target position azimuth in the target horizontal bar dial.

2. The method according to claim 1, wherein the symmetrically distributing the first azimuths and the second azimuths centered and on two sides of the orientation azimuth to obtain the target horizontal bar dial comprises:

obtaining, by the device, a plurality of target azimuths of the plurality of azimuths, an angle interval between the plurality of target azimuths being a preset angle interval; and obtaining, by the device, the target horizontal bar dial by using the plurality of target azimuths as azimuth scales of the plurality of azimuths.

3. The method according to claim 1, wherein the displaying the target horizontal bar dial in the visual field image of the virtual object comprises:

displaying, by the device, at least one azimuth name of the azimuths in the target horizontal bar dial in the visual field image of the virtual object.

4. The method according to claim 1, further comprising:

in response to the target position being deleted, canceling, by the device, display of the prompt information of the target position within the target range of the azimuth in the target horizontal bar dial.

5. The method according to claim 1, further comprising:

in response to a viewing angle of the virtual scene being changed, changing, by the device, the target horizontal bar dial.

6. A device for displaying an azimuth in a virtual scene, the device comprising:

a memory storing instructions; and a processor in communication with the memory, wherein, when the processor executes the instructions, the processor is configured to cause the device to:

obtain an orientation azimuth of a virtual object in a virtual scene, obtain a plurality of azimuths, angles between the plurality of azimuths and the orientation azimuth being no larger than a preset angle, the plurality of azimuths comprising first azimuths and second azimuths, symmetrically distribute the first azimuths and the second azimuths centered and on two sides of the orientation azimuth to obtain a target horizontal bar dial, display the target horizontal bar dial in a visual field image of the virtual object, in response to a target position being detected, obtain a target position azimuth relative to the virtual object, the target position corresponding to a position identifier in a global map or a target area, the position identifier being marked by a user or a teammate in the global map, in response to the target horizontal bar dial comprising the target position azimuth, display prompt information of the target position within a target range of the target position azimuth in the target horizontal bar dial, the prompt information comprising text information corresponding to the position identifier, a position of the prompt information on the target horizontal bar dial corresponding to a position of the position identifier in the global map, wherein a color of the position identifier and a color of the prompt information are selected according to the virtual object, in response to a flick operation, move the target horizontal bar dial according to the flick operation, a moving speed of the target horizontal bar dial being positively correlated with a flick speed of the flick operation, a moving distance of the target horizontal bar dial being positively correlated with a flick distance of the flick operation, and the flick operation acting on a position of the target horizontal bar dial to flick the target horizontal bar dial;

obtain a distance between the target position and the virtual object, and display the distance in text within the target range of the target position azimuth in the target horizontal bar dial.

7. The device according to claim 6, wherein, when the processor is configured to cause the device to symmetrically distribute the first azimuths and the second azimuths centered and on two sides of the orientation azimuth to obtain the target horizontal bar dial, the processor is configured to cause the device to:

obtain a plurality of target azimuths of the plurality of azimuths, an angle interval between the plurality of target azimuths being a preset angle interval; and obtain the target horizontal bar dial by using the plurality of target azimuths as azimuth scales of the plurality of azimuths.

8. The device according to claim 6, wherein, when the processor is configured to cause the device to display the target horizontal bar dial in the visual field image of the virtual object, the processor is configured to cause the device to:

display at least one azimuth name of the azimuths in the target horizontal bar dial in the visual field image of the virtual object.

9. The device according to claim 6, wherein, when the processor executes the instructions, the processor is configured to further cause the device to:

in response to the target position being deleted, cancel display of the prompt information of the target position within the target range of the azimuth in the target horizontal bar dial.

10. The device according to claim 6, wherein, when the processor executes the instructions, the processor is configured to further cause the device to:

in response to a viewing angle of the virtual scene being changed, change the target horizontal bar dial.

11. A non-transitory computer-readable storage medium storing computer readable instructions, wherein, the computer readable instructions, when executed by a processor, are configured to cause the processor to perform:

obtaining an orientation azimuth of a virtual object in a virtual scene;

obtaining a plurality of azimuths, angles between the plurality of azimuths and the orientation azimuth being no larger than a preset angle, the plurality of azimuths comprising first azimuths and second azimuths;

symmetrically distributing the first azimuths and the second azimuths centered and on two sides of the orientation azimuth to obtain a target horizontal bar dial;

displaying the target horizontal bar dial in a visual field image of the virtual object;

in response to a target position being detected, obtaining a target position azimuth relative to the virtual object, the target position corresponding to a position identifier in a global map or a target area, the position identifier being marked by a user or a teammate in the global map;

in response to the target horizontal bar dial comprising the target position azimuth, displaying prompt information of the target position within a target range of the target position azimuth in the target horizontal bar dial, the prompt information comprising text information corresponding to the position identifier, a position of the prompt information on the target horizontal bar dial corresponding to a position of the position identifier in the global map, wherein a color of the position identifier and a color of the prompt information are selected according to the virtual object;

in response to a flick operation, moving the target horizontal bar dial according to the flick operation, a moving speed of the target horizontal bar dial being positively correlated with a flick speed of the flick operation, a moving distance of the target horizontal bar dial being positively correlated with a flick distance of the flick operation, and the flick operation acting on a position of the target horizontal bar dial to flick the target horizontal bar dial;

obtaining a distance between the target position and the virtual object; and displaying the distance in text within the target range of the target position azimuth in the target horizontal bar dial.

12. The non-transitory computer-readable storage medium according to claim 11, wherein, when the computer readable instructions are configured to cause the processor to perform symmetrically distributing the first azimuths and the second azimuths centered and on two sides of the orientation azimuth to obtain the target horizontal bar dial, the computer readable instructions are configured to cause the processor to perform:

obtaining a plurality of target azimuths of the plurality of azimuths, an angle interval between the plurality of target azimuths being a preset angle interval; and obtaining the target horizontal bar dial by using the plurality of target azimuths as azimuth scales of the plurality of azimuths.

13. The non-transitory computer-readable storage medium according to claim 11, wherein, when the computer readable instructions are configured to cause the processor to perform displaying the target horizontal bar dial in the visual field image of the virtual object, the computer readable instructions are configured to cause the processor to perform:

displaying at least one azimuth name of the azimuths in the target horizontal bar dial in the visual field image of the virtual object.

14. The non-transitory computer-readable storage medium according to claim 11, wherein, the computer readable instructions, when executed by the processor, are configured to further cause the processor to perform:

in response to the target position being deleted, canceling display of the prompt information of the target position within the target range of the azimuth in the target horizontal bar dial.

15. The non-transitory computer-readable storage medium according to claim 11, wherein, the computer readable instructions, when executed by the processor, are configured to further cause the processor to perform:

in response to a viewing angle of the virtual scene being changed, changing the target horizontal bar dial.

\* \* \* \* \*